(12) United States Patent
Asakura et al.

(10) Patent No.: US 6,307,198 B1
(45) Date of Patent: Oct. 23, 2001

(54) WATER DROPLET SENSOR AND EXPOSURE SYSTEM FOR HOLOGRAM

(75) Inventors: Motoh Asakura; Shinji Nishikawa, both of Mie; Chikara Hashimoto, Saitama, all of (JP)

(73) Assignee: Central Glass Company, Limited, Ube (JP)

( * ) Notice: Subject to any disclaimer, the term of this patent is extended or adjusted under 35 U.S.C. 154(b) by 0 days.

(21) Appl. No.: 09/431,328

(22) Filed: Nov. 2, 1999

(30) Foreign Application Priority Data

| Nov. 2, 1998 | (JP) | ................................................ | 10-312015 |
| Nov. 30, 1998 | (JP) | ................................................ | 10-340109 |
| Dec. 25, 1998 | (JP) | ................................................ | 10-369651 |
| Dec. 25, 1998 | (JP) | ................................................ | 10-369652 |
| Dec. 28, 1998 | (JP) | ................................................ | 10-372573 |
| Dec. 28, 1998 | (JP) | ................................................ | 10-372574 |
| Mar. 2, 1999 | (JP) | ................................................ | 11-053540 |
| Mar. 10, 1999 | (JP) | ................................................ | 11-062961 |

(51) Int. Cl.[7] ...................................................... G02B 6/42
(52) U.S. Cl. ...................... 250/227.25; 340/602; 318/483
(58) Field of Search ........................ 250/227.25, 227.24, 250/573, 574, 221; 340/602, 603, 604; 318/DIG. 2, 483

(56) References Cited

U.S. PATENT DOCUMENTS 5,341,230 * 8/1994 Smith ...................................... 359/13

FOREIGN PATENT DOCUMENTS

| 9-257952 | 10/1997 | (JP) . |
| 10-62336 | 3/1998 | (JP) . |
| 10-96791 | 4/1998 | (JP) . |

* cited by examiner

Primary Examiner—Que T. Le
(74) Attorney, Agent, or Firm—Crowell & Moring LLP

(57) ABSTRACT

A water sensor, such as a rain or dew sensor, includes a light emitting device for producing sensing light to be reflected in a transparent plate such as a windshield glass panel of a vehicle, a light receiving device for receiving the sensing light, and a hologram sheet having at least one hologram for defining a light path of the sensing light between the light emitting device and the light receiving device. The hologram sheet may be attached to the inside surface of a windshield glass panel or interposed between inside and outside glass layers of a laminated glass panel.

59 Claims, 17 Drawing Sheets

WATER DROPLET SENSOR AND EXPOSURE SYSTEM FOR HOLOGRAM

BACKGROUND OF THE INVENTION

The present invention relates to a sensor for sensing water such as rain or dew on transparent plates such as windshields of vehicles, and window panes of houses or other facilities, to turn on wipers, defroster, warning device or some other device, and a system for producing holograms usable in such sensors.

Japanese Patent Provisional (Kokai) Publications Nos. H10(1998)-96791, H10(1998)-62336 and H9(1997)-257952 show rain or dew sensors having light emitting and light receiving elements.

SUMMARY OF THE INVENTION

A sensing system of the above-mentioned Japanese Publication H10(1998)-96791 has a light emitting device and a light receiving device so arranged that a light beam from the light emitting device and a visual field of the light receiving device intersect each other at an outside position at a predetermined distance from a windshield glass panel. However, consumption of energy for emitting infrared sensing light always to a wide sensing region is problematical specifically in the case of a heat blocking windshield of green type colored glass whose transmittance is equal to lower than 10% in a wavelength region of 3 μm or longer, and equal to or lower than 50% even in an infrared region. Besides, the control system of this example is large in size and complicated as a whole.

Prisms employed in a sensing system of the above-mentioned Japanese Publication H10(1998)-62336 tend to increase the size of the sensing system, constitute an obstacle to a driver, and require troublesome operations for accurately positioning the prisms and light emitting and receiving devices relative to one another.

A sensing system of the above-mentioned Japanese Publication H9(1997)-257952 is arranged to sense both rain and dew. However, this system requires a plate for guiding light, a half mirror and a mirror, so that the system is large in size, and obstructive to the visibility.

It is therefore an object of the present invention to provide a rain and/or dew sensor which is small in size and light in weight.

It is another object of the present invention to provide a compact rain and/or dew sensor which can be installed in a shade band region of a vehicle windshield without blocking the visual field of a driver.

It is still another object of the present invention to provide an exposing system for producing holograms.

A sensing system proposed by the inventors of the present application employs an entrance hologram for introducing sensing light and an exit hologram for taking out the sensing light. Fabrication of two distinct holograms normally requires two exposing operations, and two separate holograms requires a difficult alignment operation for attaching the holograms, as entrance hologram and exit hologram, to a windshield.

It is therefore still another object of the present invention to provide a hologram exposing system which is capable of facilitating the setting of an optical system and forming two holograms in a single hologram sheet in one exposing operation without the need for complicated light reducing operation of preventing irradiation of unwanted light (such as stray laser light falling upon a glass base plate at an angle greater than a critical angle of the glass base plate) to a hologram region, and without the need of complicated masking operation of preventing formation of unwanted hologram.

According to the present invention, a water sensor such as rain sensor or dew sensor, comprises: a transparent plate, such as a single layer glass panel or a laminated glass panel; a light emitting device for emitting sensing light so that the sensing light travels in the transparent plate by internal reflection in the transparent plate; a light receiving device for receiving the sensing light from the transparent plate to sense water on the transparent plate; and at least one hologram defining a light path of the sensing light through the transparent plate from the light emitting device to the light receiving device. There may be two or more holograms formed in different regions of a single hologram sheet.

An exposing system for producing a hologram according to the present invention, comprises: a transparent plate member for defining a reflection surface and a contact surface, and holding a light sensitive film between the reflection surface and the contact surface; and first and second prisms. The first prism has a contact face for contacting with the contact surface of the plate member, a first face for guiding a first reference beam so that the first reference beam travels through a first region of the light sensitive film, and a second face for guiding a laser beam so that the laser beam travels through the first region of the light sensitive film as a first object beam to form a first hologram in the first region of the light sensitive film with the first reference beam. The second prism has a contact face for contacting with the contact surface of the plate member, a first face for guiding a second object beam so that the second object beam travels through a second region of the light sensitive film, and a second face for guiding the laser beam reflected internally from the reflection surface of the plate member so that the reflected laser beam travels through the second region of the light sensitive film as a second reference beam to form a second hologram in the second region of the light sensitive film with the second object beam.

According to one aspect of the present invention, a water sensor such as rain sensor, comprises: a transparent plate, such as a windshield glass panel; a light emitting device for emitting sensing light so that the sensing light travels in the transparent plate by internal reflection in the transparent plate; a light receiving device for receiving the sensing light from the transparent plate to sense water on the transparent plate; and an optical element, such as a hologram or a concave mirror, disposed on a surface of the transparent plate or in the transparent plate, for converging the sensing light in the (non-convergent) form of a divergent beam or parallel beam and directing the sensing light in the convergent form to the light receiving device.

DETAILED DESCRIPTION OF THE INVENTION

Figure 1:
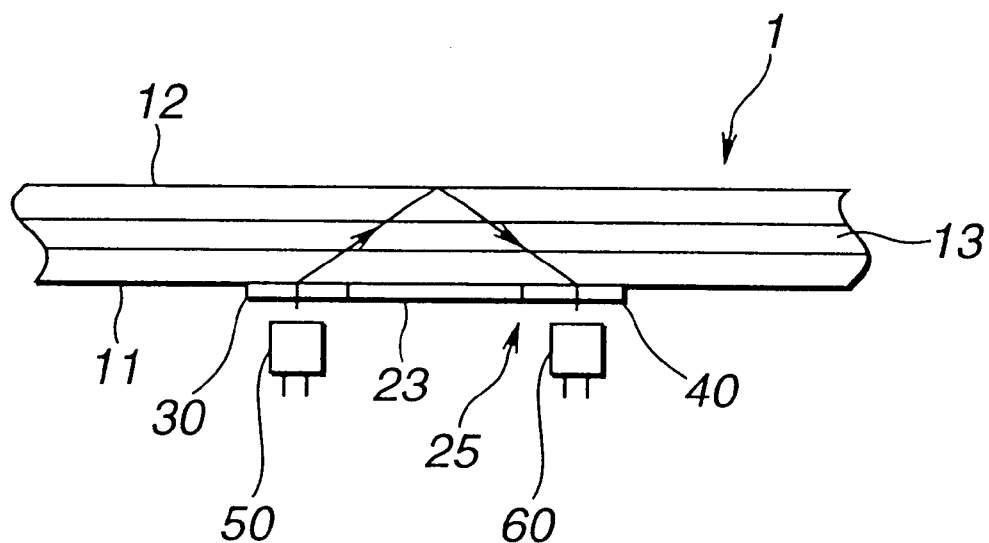
FIG. 1 is a schematic sectional view showing a part of a windshield glass plate in a first practical example according to the present invention.

A water sensor, such as a rain or raindrop sensor or a dew sensor, according to the present invention is preferably applied to a windshield (or front window) of a motor vehicle, or some other vehicle such as marine vessel, airplane, or electric railcar. The water droplet sensor may be arranged to automatically drive a windshield wiper system of a vehicle in case of rain or a defroster system of a vehicle in case of dew. The water droplet sensor can be also applied to a window pane for housing to alarm rain to a dweller. The water droplet sensor according to the present invention has numerous other applications.

As a transparent plate, it is possible to employ plate glass, laminated or safety glass made up of two sheets of plate glass bonded together by an interlayer of material such as polyvinyl butyral, or bilayer glass having a sheet of transparent resin bonded to a sheet of plate glass. Alternatively, it is possible to employ a transparent plate of resin such as polycarbonate.

As a light emitting device, it is possible to employ a light emitting diode capable of providing monochromatic radiation in a narrow wavelength range, an EL (electroluminescent) device, or some other device which is small in size and narrow in the wavelength range.

As a light receiving device, it is possible to employ a photodiode or any of various other light sensitive devices light in weight and small in size.

An entrance hologram is a hologram for receiving sensing light from the light emitting device and diffracting (bending) the sensing light to cause the sensing light to travel in an angle range of 41.8°~60.1° in the transparent plate so that the sensing light totally reflects in the transparent plate (refractive index=1.5) in the absence of raindrops but doe not totally reflect in the case of existence of raindrops (refractive index=1.3). Preferably, the incident angle to the hologram is set approximately equal to zero. However, the arrangement making the incident angle exactly equal to zero is not advantageous since reflected light returns to a light source in an exposure process.

An exit hologram has optical properties contrasting with the entrance hologram. The exit hologram diffracts the sensing light coming in the angle range of 41.8°~60.1° in the transparent plate, to an angle equal to or smaller than 41.8°, and lets out the sensing light to the light receiving device.

Each of the entrance hologram and the exit hologram may be a transmission hologram or a reflection hologram. In the case of rain detection, transmission holograms are normally preferable.

The entrance hologram and exit hologram may be produced separately. However, separate holograms requires a troublesome alignment operation. It is therefore preferable to produce the entrance hologram and exit hologram integrally in a single hologram sheet. A single hologram sheet including the entrance hologram and the exit hologram facilitates an operation for applying holograms to a glass plate, and hence an overall assembly process. Moreover, a hologram sheet having one or more holograms is advantageous in size and shape as compared to a prism.

It is optional to employ a converging hologram (as in third and fourth practical examples). In this case, the entrance hologram may be designed to diverge the sensing light to enlarge the sensing area, and the converging hologram is arranged to converge the spread sensing light. Alternatively, the exit hologram may be designed to converge the sensing light and to serve as a converging hologram.

Figure 5:
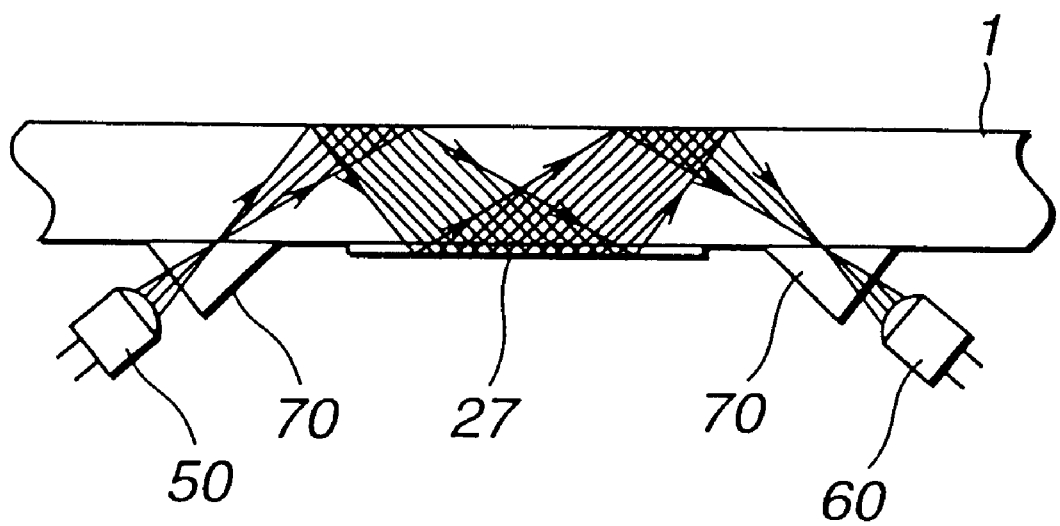
FIG. 5 is a schematic sectional view showing a part of a windshield glass plate in a fifth practical example according to the present invention.

It is optional to employ one or more prisms so as to cause the sensing light of the light emitting device to diverge in the angle range of 41.8°~60.1° in the transparent plate, and a total reflection hologram (as in a fifth practical example of FIG. 5).

At least one of the light emitting device and the light receiving device may be provided at an edge of the transparent plate (as in 6th~8th practical examples). In this case, the light sensing device and/or the light receiving device can be installed inside an instrument panel, instead of being bared on the inside surface of the transparent plate, projecting from the inside surface and narrowing the driver's view.

A sensor according to the present invention may be arranged to sense both rain on the outside and dew on the inside (as in 9th~14th practical examples). In this case, rain sensing light and dew sensing light may be produced by using two light emitting devices, or by diving sensing light from a single light emitting device with a splitting element such as a combination of transmission hologram and reflection hologram superposed on each other, or a transmission hologram or a reflection hologram processed by half mirror coating.

A total reflection hologram may be interposed between two sheets of laminated glass so as to separate a zigzag path of rain sensing light reflecting between the outside glass surface and the total reflection hologram and a zigzag path of dew sensing light reflecting between the inside glass surface and the total reflection hologram. To sense rain and dew both, there are provided a rain sensing light receiving device and a dew sensing light receiving device.

The exit hologram may be formed as a return hologram of reflection type for returning incident light back toward the incident direction. By using a return hologram, it is possible to place the light emitting device and light receiving device close to each other.

A rain/dew sensor may be placed behind an internal rear view mirror so as not to reduce the front visibility of a driver. In such a zone, the interlayer film of a laminated windshield glass panel may be tinted as a shade band. To prevent sensing light from being absorbed by the shade band, it is possible to employ two total reflection holograms (as in practical examples of FIGS. 16~18). Alternatively, it is possible to employ one total reflection hologram, omitting the dew sensing section (as in practical examples of FIGS. 19~22B).

Hologram or holograms are attached to the inside surface of a transparent plate such as a windshield, or interposed between outside and inside glass layers of laminated glass plate. From the viewpoint of durability of holograms, the interposition of hologram between two sheets of glass is preferable.

An exposing system according to the present invention is capable of producing transmission holograms and reflection holograms. For use as an entrance hologram for introducing rain sensing light into a transparent plate, a produced hologram is required to have such characteristics that a diffraction angle is equal to or greater than 41.8° in the case of plate glass (refractive index=1.5) so as to total internal reflection of the sensing light in the transparent plate, and equal to or smaller than 60.1° so as to prevent total reflection of the sensing light from an interface between a raindrop (refractive index is 1.3) and the transparent plate. For use as an exit hologram, a produced hologram is required to have such characteristics as to receive sensing light totally reflected in a transparent plate, and to cause the sensing light to emerge toward a light receiving device.

Therefore, for producing transmission holograms, first and second prism of an expositing system are put in contact with a light sensing film on a transparent base plate with a predetermined separation in the following manner. The first prism has a first flat face for insetting a first reference beam so that the first reference beam travels through a first region of the light sensitive film, and a second flat face for inletting a laser beam so that the laser beam travels through the first region of the light sensitive film as a first object beam to form a first hologram in the first region of the light sensitive film with the first reference beam. The second prism has a first flat face for outletting a second object beam so that the second object beam travels through a second region of the light sensitive film, and a second flat face for outletting the laser beam reflected internally from the reflection surface of the plate member so that the reflected laser beam travels through the second region of the light sensitive film as a second reference beam to form a second hologram in the second region of the light sensitive film with the second object beam. This system can produce the first and second holograms as entrance hologram and exit hologram by one exposing operation.

For producing reflection holograms, the direction of one of the reference beam and the object beam for each hologram is reversed. For example, a first prism has a first flat face for outletting a first reference beam and a second flat face for inletting a laser beam as a first object beam to form a first hologram with the first reference beam. A second prism has a first flat face for outletting a second object beam, and a second flat face for outletting the laser beam reflected internally from the reflection surface of the plate member as a second reference beam to form a second hologram with the second object beam. This system can produce the first and second holograms as entrance hologram and exit hologram by one exposing operation.

For producing a pair of transmission hologram and reflection hologram, a first prism has a first flat face for inletting a first reference beam and a second flat face for inletting a laser beam as a first object beam to form a first hologram with the first reference beam. A second prism has a first flat face for inletting a second object beam, and a second flat face for outletting the laser beam reflected internally from the reflection surface of the plate member as a second reference beam to form a second hologram with the second object beam. This system can produce the first and second holograms as entrance hologram and exit hologram by one exposing operation.

The exposing system according to the present invention can produce a third hologram for propagation between the first and second holograms by one exposing operation.

Prisms can be produced, from a glass plate having flat and smooth surfaces, by forming the first and second faces by cutting and polishing. When the transparent glass plate is curved, the arrangement with the first and second prisms in the form of two separate pieces is generally advantageous for good contact between the glass plate and prisms. When the glass plate is flat or the curvature of the glass plate is small, the use of a single peace having the first and second prisms as integral parts is advantageous in that the single piece can be readily put in contact with the glass plate at a correct position. In this case, a reflection film may be provided in an interface with a light sensing film.

Figure 23:
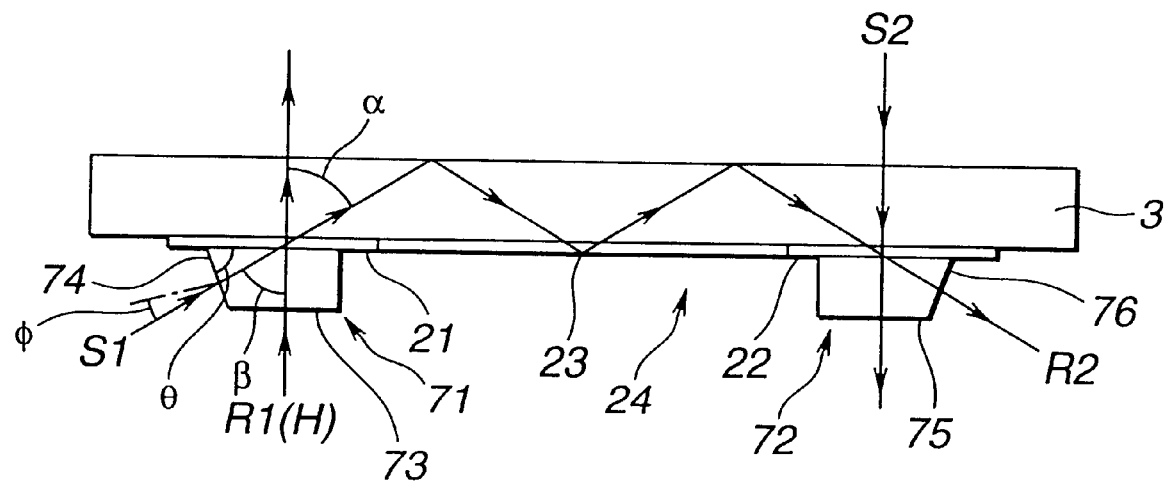
FIG. 23 is a schematic view showing an exposing system in a twentieth practical example according to the present invention.

A face of each prism for causing total reflection of a laser beam in a transparent plate is oriented as shown, by way of an example, in FIG. 23. By using a refractive index n1 of a glass plate (3) and a refractive index n2 of a prism (71), angles β, and α shown in FIG. 23 are given by:

$$\beta = \theta° - \sin^{-1}(\sin\phi/n2)°,$$

$$\alpha = \sin^{-1}\{\sin \beta \cdot (n2/n1)\}°$$

In this example, the refractive index of the prism is equal to that of the glass plate. Accordingly, n1=n2=n, and α=β.

For the first object beam S1 to advance by total internal reflection in the glass plate, the following condition must be satisfied:

$$\sin^{-1}(1/n)° \leq \alpha < 90°$$

Therefore, $\sin^{-1}(1/n)° \leq \theta° - \sin^{-1}(\sin \phi/n)° < 90°$. As a result, the requirement is;

$$\sin^{-1}(1/n)° + \sin^{-1}(\sin \phi/n)° < \theta \leq 90° + \sin^{-1}(\sin \phi/n)°$$

Even if a first face (73) of a prism (71) is longer, as viewed in FIG. 23, than a contact face contacting with a light sensitive film (24), and hence the angle θ is greater than 90°, the first face can cause a total reflection of a first object beam. However, this arrangement is not desirable in that the incident angle is increased.

When a first reference beam is directed along the normal to the first face (73) of the prism (71), the beam is reflected from the first face and returned to a laser light source, so that the laser beam becomes unstable. Therefore, it is preferable to shift the direction of the first reference beam slightly from the normal direction.

The first face 73 extends along a surface of the glass plate, or along the light sensitive film. However, the first face is not necessarily parallel to the surface of the glass plate 3. The first face 73 may be slightly inclined within a range for the first reference beam R1 to pass through the glass plate almost completely without total reflection in the glass plate.

One preferable example of a light sensitive film is a photopolymer film. For example, photopolymer polymer (such as Dupont OmniDex-352 (a product of the Dupont company)) is applied to form a 25 μm thick photopolymer layer on a resin film.

Holograms produced by an exposing system according to the present invention can be used for rain or dew sensors, specifically as entrance hologram and exit hologram.

Figure 2:
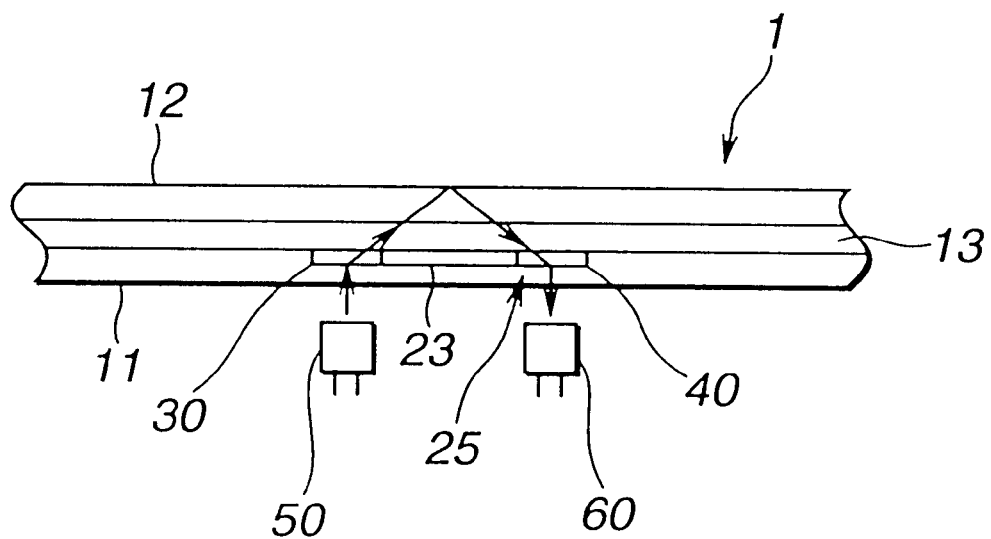
FIG. 2 is a schematic sectional view showing a part of a windshield glass plate in a second practical example according to the present invention.

FIGS. 1 and 2 are sectional views for illustrating first and second practical example of the present invention.

PRACTICAL EXAMPLE 1

FIG. 1 shows a first practical example in which a transparent plate 1 is a windshield of a vehicle, and a transmission type hologram sheet 25 is disposed on the inside surface of the windshield. A light emitting device 50 is an Al—Ga—As system light emitting diode providing near-infrared radiation. A light receiving device 60 is a germanium element. The transmission hologram sheet 25 is prepared in the following manner.

First, a first interference pattern for an entrance hologram 30 is formed in a region of a light sensitive film. The light sensitive film used in this example is a photopolymer film having a 50 μm thick coating layer of photopolymer polymer spread on a resin film (such as Dupont OmniDex-352). The light sensitive film of this example is a 10 mm×30 mm rectangular sheet, and the 10 mm×30 mm rectangular area of the sheet is divided into a 10 mm×10 mm first region, a 10 mm×10 mm second region and a 10 mm×10 mm intermediate region between the first and second regions. The first interference pattern is formed in the first region by irradiating first and second beams onto a first surface of the light sensitive film with an optical system including a laser oscillator for producing light of 647 nm, at least one beam splitter, convex lenses and mirrors, in the state in which the second and intermediate regions are masked, and only the first region is bared for exposure. The first and second beams are produced by dividing an original laser beam. By using a glass block, the first and second beams are directed to the first region, in the form of divergent light having an incident angle of 6.2° and divergent light having an incident angle of 43.8° so as to make a reproduction angle (or reconstruction angle) for one beam equal to 0°, and make a reproduction angle for the other beam equal to an angle in a range of 41.8°~60.1°.

Then, a second interference pattern for an exit hologram 40 is formed in the second region of the light sensitive film with the first and intermediate regions being masked. The second interference pattern is formed in the second region by irradiating first and second beams onto a second surface of the light sensitive film in the same manner in the state in which the first and intermediate regions are masked, and only the second region is bared for exposure. The first and second beams are produced by dividing an original laser beam. By using a glass block, the first and second beams are directed to the second region, in the form of divergent light having an incident angle of 6.2° and divergent light having an incident angle of 43.8° so as to make a reproduction angle (or reconstruction angle) for one beam equal to 0°, and make a reproduction angle for the other beam equal to an angle in a range of 41.8°~60.1°. Thereafter, the transmission hologram sheet is completed by development and other operations.

The thus-produced hologram sheet 25 has the entrance hologram 30 in the first region, the exit hologram 40 in the second region, and an unexposed intermediate region 23 between the entrance and exit holograms.

Conditions in the exposure such as laser, exposure wavelength, and angle of exposure can be chosen in conformity with optical characteristics of the light emitting device and light receiving device.

The hologram sheet 25 is affixed to a laminated glass plate (or panel) having an inside glass sheet 11 and an outside glass sheet 12 bonded together with an interlayer film 13 of polyvinyl butyral or the like. The light emitting device 50 is installed in front of the entrance hologram 30, and the light receiving device 60 is installed in front of the exit hologram 40 of the hologram sheet 25. Then, the laminated glass plate is installed as a windshield, in a front windshield opening of a vehicle body.

The light emitting device 50 is connected through lead conductors to a power source, and the light receiving device 60 is connected to a sensing circuit.

When it is not raining, the sensing light introduced into the glass plate from the light emitting device 50 is totally reflected by the outside surface of the glass plate 1and redirected to the light receiving device 60. In the absence of rain, almost all of the sensing light is received, with little attenuation, by the light receiving device. When raindrops are on the outside surface of the glass plate 1, part or all of the sensing light enters a raindrop or raindrops, and scatters, so that the sensing light received by the light receiving device 60 is reduced sharply to zero or a very small level.

The sensing circuit can accurately detect a raindrop by comparing the absolute value of the quantity of the received light, with a reference value corresponding to a normal quantity obtained in the absence of rain. Even if dew is formed on the inside glass layer 11, the sensing light is reflected only once by the outside glass surface, and the interface between the transmission hologram sheet 25 and the air is not involved in reflection, so that this rain sensor does not err in sensing rain.

PRACTICAL EXAMPLE 2

FIG. 2 shows a second practical example of the present invention in which the transparent plate 1is a windshield of a vehicle, and the transmission type hologram sheet 25 is interposed between the inside glass layer 11 of the windshield laminated glass plate 1 and the interlayer film 13. In other respects, the 2nd example of FIG. 2 is substantially identical to the 1st example of FIG. 1.

The transmission hologram sheet 25 is protected between the inside and outside glass layers 11 and 12, to the advantage of the durability of the hologram sheet 25. Moreover, this arrangement can decrease the length of the light path of the sensing light to reduce absorption in the glass plate 1, and further reduce the size of the hologram sheet 25 and the distance between the light emitting device 50 and the light receiving device 60.

Figure 3:
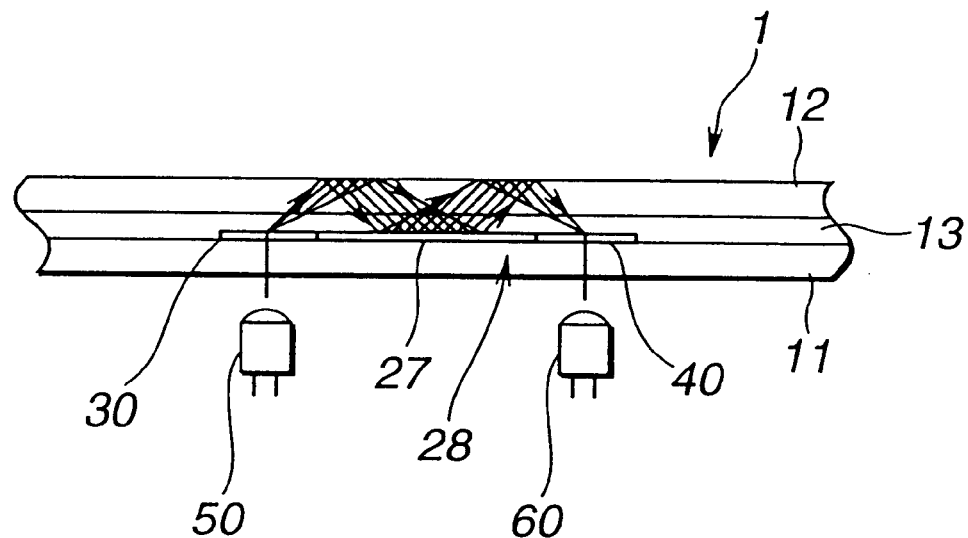
FIG. 3 is a schematic sectional view showing a part of a windshield glass plate in a third practical example according to the present invention.
Figure 4:
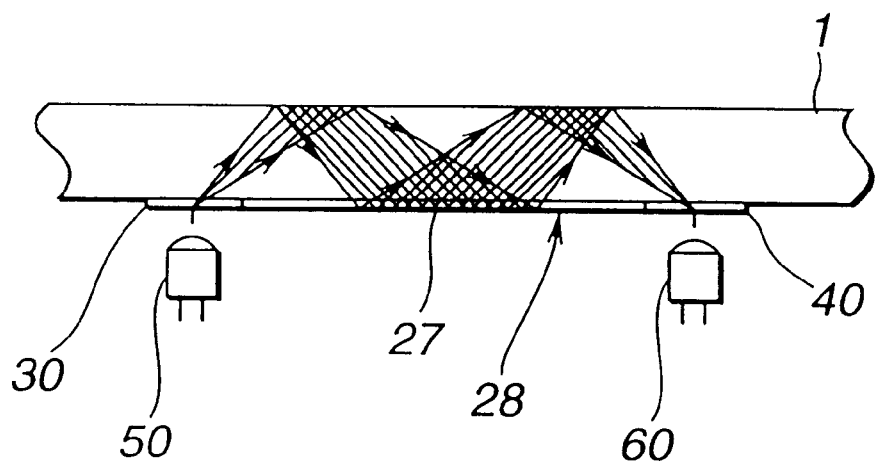
FIG. 4 is a schematic sectional view showing a part of a windshield glass plate in a fourth practical example according to the present invention.

FIGS. 3, 4 and 5 are sectional views for showing third, fourth and fifth practical examples.

PRACTICAL EXAMPLE 3

As shown in FIG. 3, the transparent plate 1 is a windshield glass plate, and the entrance hologram 30, the exit hologram 40 and a converging intermediate hologram 27 are united in a single hologram sheet 28. The hologram sheet 28 is interposed between the interlayer film 13 and the inside glass layer 11 of the laminated glass plate 1.

In the third example, too, the light emitting diode 50 is an AlGaAs near infrared light emitting diode. The light receiving device 60 is a germanium element. The hologram sheet 28 is prepared in the following manner.

First, the entrance hologram 30 is formed in a 10 mm×10 mm first region of a 10 mm×30 mm light sensitive photopolymer film as in the first example. The entrance hologram is formed in the first region by irradiating first and second beams onto a first surface of the light sensitive film with an optical system including a laser oscillator for producing light of 647 nm, at least one beam splitter, convex lenses and mirrors, in the state in which the remaining regions of the sheet are masked, and only the first region is bared for exposure. The first and second beams are produced by dividing an original laser beam. By using a glass block, the first and second beams are directed to the light sensitive film in the form of divergent light having an incident angle of 6.2° and divergent light having an incident angle of 43.8° so as to make a reproduction angle (or reconstruction angle) for one beam equal to 0°, and make a reproduction angle for the other beam equal to an angle in a range of 41.8°~60.1°.

Then, the exit hologram 40 is formed in a 10 mm×10 mm second region of the light sensitive film with the other regions being masked. The exit hologram 40 is formed in the second region by irradiating first and second beams onto a second surface of the light sensitive film in the same manner. The first and second beams are produced by dividing an original laser beam of 647 nm. By using a glass block, the first and second beams are directed to the light sensitive film in the form of convergent light having an incident angle of 6.2° and convergent light having an incident angle of 43.8° so as to make a reproduction angle (or reconstruction angle) for one beam equal to 0°, and make a reproduction angle for the other beam equal to an angle in a range of 41.8°~60.1°.

Then, the converging hologram 27 is formed in an intermediate region of the light sensitive film between the first and second regions, with the first and second regions being masked. The converging hologram 27 is formed in the intermediate region by irradiating first and second beams, respectively, onto the first surface and the second surface of the light sensitive film. The first and second beams are produced by dividing an original laser beam of 647 nm. By using a glass block, the first and second beams are directed to the intermediate region, in the form of divergent light having an incident angle of 60.7° and convergent light having an incident angle of 60.7° so as to make a reproduction angle (or reconstruction angle) for one beam equal to 41.8°~60.1°, and make a reproduction angle for the other beam equal to an angle in a range of 41.8°~60.1°.

Thereafter, the hologram sheet 28 is completed by development and other operations.

The thus-produced hologram sheet 28 has, as integral parts, the entrance hologram 30 in the first region, the exit hologram 40 in the second region, and the converging hologram 27 between the entrance and exit holograms 30 and 40.

Conditions in the exposure such as laser, exposure wavelength, and angle of exposure can be chosen in conformity with optical characteristics of the light emitting device and light receiving device.

The hologram sheet 28 is affixed to the inner surface of the inside glass sheet 11 which is the surface facing to the interlayer film 13. The light emitting device 50 is installed in front of the entrance hologram 30, and the light receiving device 60 is installed in front of the exit hologram 40 of the hologram sheet 28. Then, the laminated glass plate is installed as a windshield, in a front windshield opening of a vehicle body.

The rain sensor can sense raindrops accurately in the same manner as in the first example. In this example, it is possible to improve the sensitivity of the rain detection by using divergent light as the sensing light to cover a wider sensing area. The converging hologram 27 provided in the sensing light path condenses the light and direct almost all of the sensing light to the light receiving device 60.

PRACTICAL EXAMPLE 4

As shown in FIG. 4, the transparent plate 1 is a single layer glass plate, and the hologram sheet 28 integrally formed with the entrance hologram 30, the exit hologram 40 and the converging intermediate hologram 27 is attached to the inside surface of the glass plate 1. In other respects, the fourth example is substantially identical to the third example.

PRACTICAL EXAMPLE 5

As shown in FIG. 5, this example employs two prisms 70, as entrance optical element and exit optical element, in place of the entrance hologram and exit hologram, and a covering hologram 27 attached to the transparent plate 1 in the form of a single layer glass plate. The sensor can improve the sensitivity in the same manner as in the preceding examples.

FIGS. 6A~8B are views for illustrating sixth eighth practical examples.

PRACTICAL EXAMPLE 6

Figure 6A:
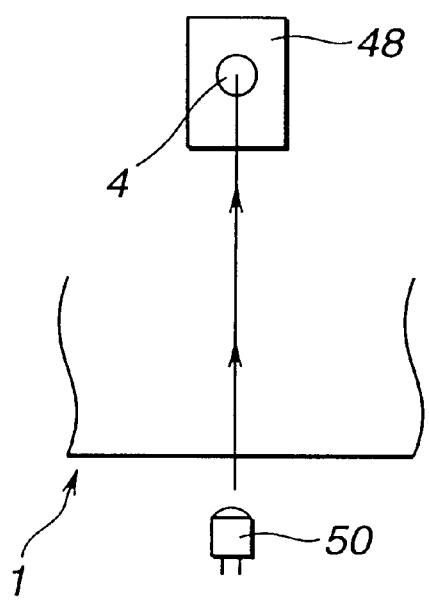
FIGS. 6A and 6B are, respectively, schematic plan view and sectional view for showing a part of a windshield glass plate in a sixth practical example.
Figure 6B:
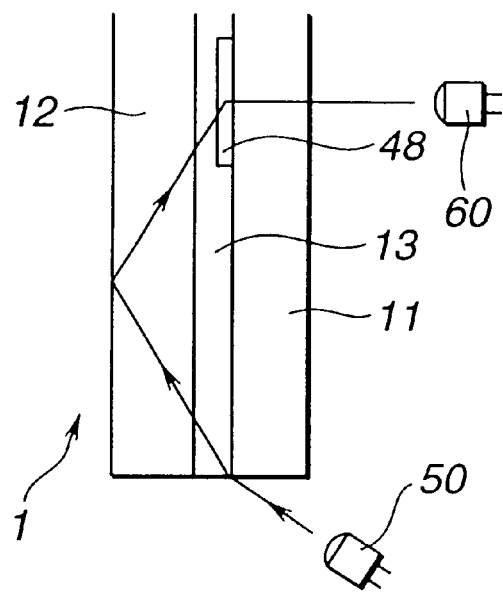

As shown in FIGS. 6A and 6B, a light emitting device 50 is disposed near the end of a transparent plate 1 in the form of a windshield laminated glass plate, an exit hologram 48 is interposed between the inside and outside glass layers 11 and 12, and a light receiving device 60 is disposed at the side of the transparent plate 1 on the interior side.

In the sixth example, too, the light emitting diode 50 is an AlGaAs near-infrared light emitting diode, and the light receiving device 60 is a germanium element. The exit hologram 48 is prepared in the following manner.

The hologram 48 is formed in a light sensitive photopolymer film as in the first example by irradiating first and second beams onto a first surface of the light sensitive film with an optical system including a laser oscillator for producing light of 647 nm, at least one beam splitter, convex lenses and mirrors. The first and second beams are produced by dividing an original laser beam. By using a glass block, the first and second beams are directed to one surface of the light sensitive film, in the form of convergent light having an incident angle of 6.2° and divergent light having an incident angle of 43.8° so that the reproduction angle for one beam is equal to 0°, and the reproduction angle for the other beam is equal to an angle in a range of 41.8°~60.1°.

Thereafter, the hologram 48 is completed by development and other operations.

The hologram 48 is affixed to the inner surface of the inside glass sheet 11 which is the surface facing to the interlayer film 13. The light receiving device 60 is installed in front of the hologram 48. Then, the laminated glass plate is installed as a windshield, in a front windshield opening of a vehicle body.

The light emitting device 50 is installed in the vehicle body before the installation of the windshield in the vehicle body.

The rain sensor can sense raindrops accurately in the same manner as in the first example. Even if dew is formed on the inside glass layer 11, the sensing light is reflected only once by the outside glass surface, and the interface between the transmission hologram sheet 25 and the air is not involved in reflection, so that this rain sensor does not err in sensing rain. In this example, the sensing light is introduced from the end of the transparent plate without the need for an entrance hologram.

PRACTICAL EXAMPLE 7

Figure 7A:
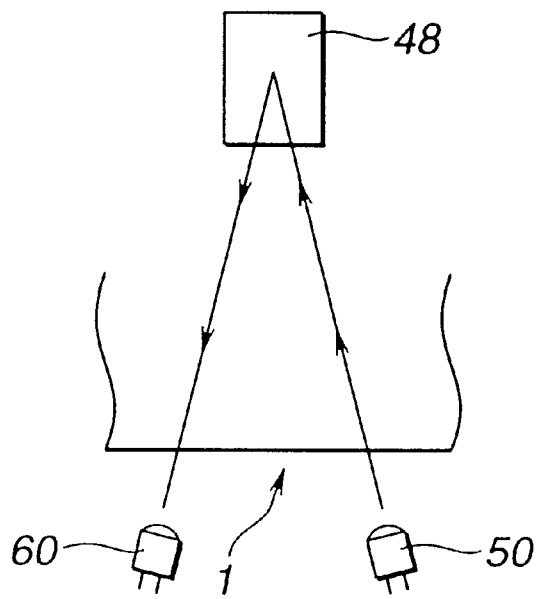
FIGS. 7A and 7B are, respectively, schematic plan view and sectional view for showing a part of a windshield glass plate in a seventh practical example.
Figure 7B:
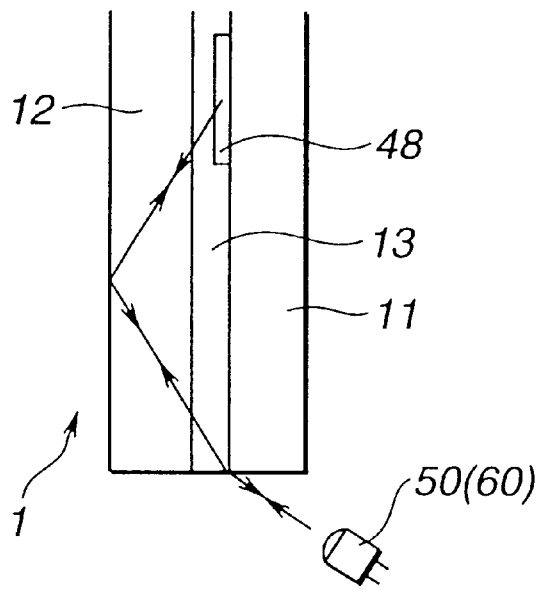

As shown in FIGS. 7A and 7B, the light emitting device 50 and the light receiving device 60 are both disposed near, and aimed at, the end of the transparent plate 1 in the form of a windshield laminated glass plate. An exit hologram 48 serves as a return hologram. The return hologram 48 is interposed between the inside and outside glass layers 11 and 12, and designed to receive the sensing light from the light emitting device 50 at the edge of the glass plate 1 and to totally reflect the sensing light back toward the light receiving device 60 at the edge of the glass plate. The total reflection path of the sensing light in the glass plate consists of a first segment from the light emitting device 50 to the reflection point in the exit hologram 48 and a second segment from the reflection point in the exit hologram 48 to the light receiving device 60. The first segment and the second segment are coincident with each other in the sectional view of FIG. 7B, but, in the plan view of FIG. 7A, the first and second segments diverge from the reflection point. In this example, each of the first and second segment has one total reflection point on the outside surface of the glass plate 1. Thus, the sensing light enters and exits the transparent plate 1 through the edge of the transparent plate 1. In other respects, the seventh example is substantially identical to the sixth example.

An interference pattern for the return hologram 48 is formed by irradiating first and second beams from two direction in an incident angle range of 41.8°~60.1° in the form of a pair of divergent light and convergent light or a pair of parallel light and parallel light from two different surfaces, through a glass block or a hologram.

In this example, it is not necessary to fix the light emitting device 50 and the light receiving device 60 to the inside surface of the glass plate 1. The devices 50 and 60 are concealed in the instrument panel without forming obstructive projections on the inside surface of the glass plate 1. With the correctly set devices 50 and 60, the rain sensor can sense raindrops accurately, in the same manner as in the preceding examples.

PRACTICAL EXAMPLE 8

Figure 8A:
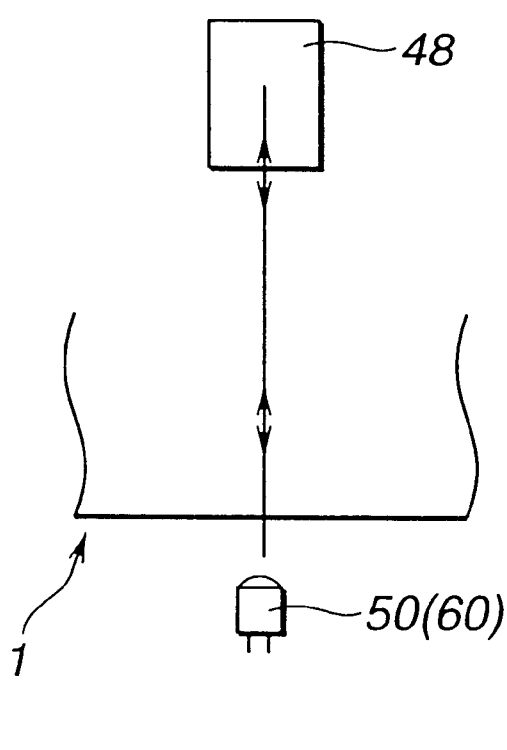
FIGS. 8A and 8B are, respectively, schematic plan view and sectional view for showing a part of a windshield glass plate in an eighth practical example.
Figure 8B:
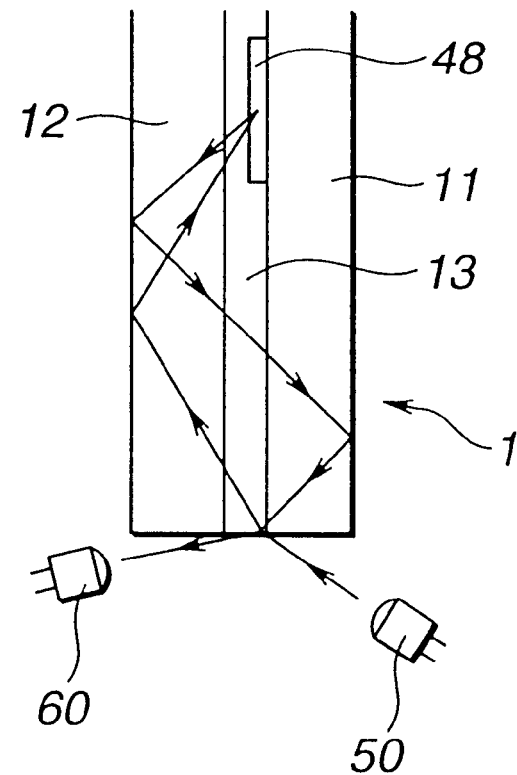

As shown in FIGS. 8A and 8B, the light emitting device 50 and the light receiving device 60 are both disposed near the end of the transparent plate 1 in the form of a windshield laminated glass plate. The exit hologram 48 is interposed between the inside and outside glass layers 11 and 12, and designed to serve as a return hologram for receiving the sensing light from the light emitting device 50 at the edge of the glass plate 1 and for totally reflecting the sensing light back toward the light receiving device 60 at the edge of the glass plate. The total reflection path of the sensing light in the glass plate consists of a first segment from the light emitting device 50 to the reflection point in the return hologram 48 and a second segment from the reflection point in the return hologram 48 to the light receiving device 60. The first segment and the second segment are coincident with each other in the plan view of FIG. 8A, but, in the sectional view of FIG. 8B, the first and second segments extend in different directions from the reflection point. In this example, the first segment has one total reflection point on the outside surface of the glass plate 1, and the second segment has one total reflection point on the outside surface of the glass plate 1 and one total reflection point on the inside surface of the glass plate 1. The sensing light enters and exits the transparent plate 1 through the edge of the transparent plate 1. In other respects, the eighth example is substantially identical to the sixth example.

An interference pattern for the hologram 48 is formed by irradiating first and second beams from two direction in an incident angle range of 41.8°~60.1° in the form of a pair of divergent light and convergent light or a pair of parallel light and parallel light from different surfaces, through a glass block or a hologram.

In this example, the devices 50 and 60 are concealed in the instrument panel without forming obstructive projections on the inside surface of the glass plate 1. With the correctly set devices 50 and 60, the rain sensor can sense raindrops accurately, in the same manner as in the preceding examples.

PRACTICAL EXAMPLE 9

In the ninth practical example, the light emitting device 50 is disposed at the side of the transparent plate and aimed at the inside surface of the transparent plate 1 in the form of a windshield laminated glass plate, and the light receiving device 60 is disposed at the end of the transparent plate 1. The sensing light is introduced from the light emitting device 50 into the transparent plate 1 through an entrance hologram, and let out through the end surface of the transparent plate 1. The light emitting device 50 is disposed at the position of the device 60 shown in FIGS. 6A and 6B, the light receiving device 60 is disposed at the position of the device 50 shown in FIGS. 6A and 6B, and the exit hologram 48 of FIGS. 6A and 6B is replaced by an entrance hologram. The sensing light travels in the reverse direction along the light path shown in FIGS. 6A and 6B.

Figure 9:
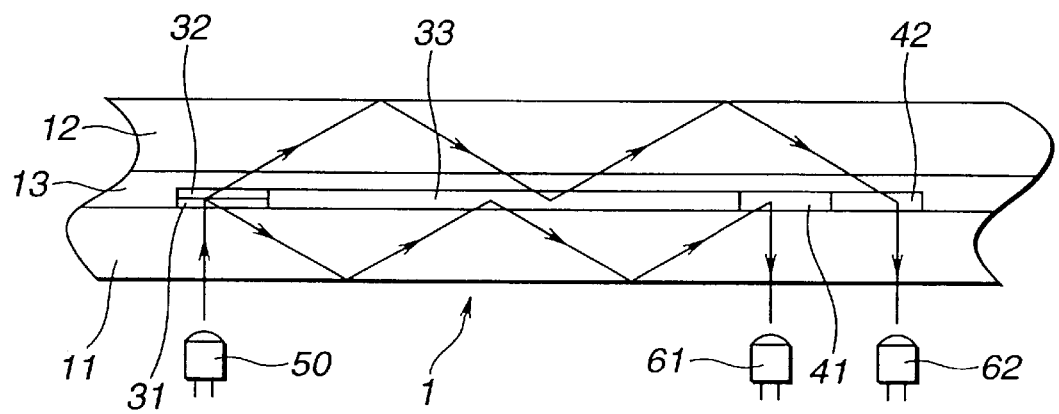
FIG. 9 is a schematic sectional view showing a part of a windshield glass plate in a tenth practical example according to the present invention.
Figure 10:
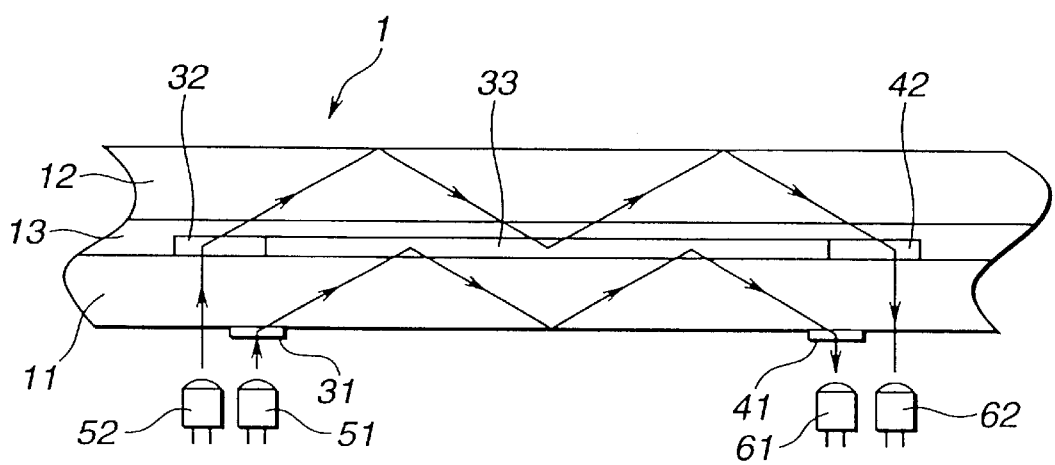
FIG. 10 is a schematic sectional view showing a part of a windshield glass plate in an eleventh practical example according to the present invention.

FIGS. 9~11 are views for illustrating tenth~twelfth practical examples.

PRACTICAL EXAMPLE 10

As shown in FIG. 9, a sensor of a tenth practical example is configured to sense rain and dew with two entrance holograms 31 and 32, a total reflection hologram 33, two exit holograms 41 and 42, a single light emitting device 50 and two light receiving devices 61 and 62.

The light emitting diode 50 is an AlGaAs near-infrared light emitting device, and the light receiving devices 61 and 62 are germanium devices. The holograms, 31~33, 41 and 42 are prepared in the following manner.

First, a first interference pattern for the first entrance hologram 31 is formed in a 10 mm×4 mm left side region of a 10 mm×18 mm light sensitive film. The light sensitive film used in this example is a photopolymer film having a 25 μm thick coating layer of photopolymer spread on a resin film (such as Dupont OmniDex-352). The first interference pattern having a diffraction efficiency of about 50% is formed in the 10 mm×4 mm left side region, by irradiating first and second beams, respectively, onto first and second surfaces of the light sensitive film at a reduced level of light exposure with an optical system including a laser oscillator for producing light of 647 nm, a beam splitter, convex lenses and mirrors, in the state in which the remaining region of the light sensitive film is masked, and only the left side region is bared for exposure. The first and second beams are produced by dividing an original laser beam. By using a glass block, the first and second beams are directed to the first and second surfaces of the light sensitive film, in the form of divergent light having an incident angle of 6.2° and parallel light having an incident angle of 43.8° so that a reproduction angle for one beam is equal to 0°, and a reproduction angle for the other beam is equal to an angle in a range of 41.8°~60.1°.

Then, an interference pattern for the total reflection hologram 33 is formed in an 10 mm×6 mm intermediate region of the light sensitive film with left side and right side 10 mm×8 mm regions being masked. The interference pattern for the total reflection hologram 33 is formed in the intermediate region by irradiating first and second beams, respectively, onto the first and second surfaces of the light sensitive film in the same manner. The first and second beams are produced by dividing an original laser beam of 647 nm. By using a glass block, the first and second beams are directed to the light sensitive film, in the form of parallel light of 60.7° and parallel light of 60.7° so that a reproduction angle for one beam equal is in the range of 41.8°~60.1°, and a reproduction angle for the other beam is in the range of 41.8°~60.1°.

Then, an interference pattern for the exit hologram 41 is formed in an 10 mm×4 mm right side region of the light sensitive film next to the intermediate region on the right side, with the remaining regions being masked. The interference pattern for the exit hologram 41 is formed in by irradiating first and second beams, respectively, onto the first and second surfaces of the light sensitive film in the same manner. The first and second beams are produced by dividing an original laser beam of 647 nm. By using a glass block, the first and second beams are directed in the form of convergent light of an incident angle of 21.4° and parallel light of 71.4° so that a reproduction angle for one beam equal is 0°, and a reproduction angle for the other beam is in the range of 41.8°~60.1°.

Then, an interference pattern for the exit hologram 42 is formed in an 10 mm×4 mm right side region of the light sensitive film next to the region of the hologram 41, with the remaining regions being masked. The interference pattern for the exit hologram 42 is formed by irradiating first and second beams, respectively, onto one and the same surface of the light sensitive film in the same manner. The first and second beams are produced by dividing an original laser beam of 647 nm. By using a glass block, the first and second beams are directed in the form of convergent light of an incident angle of 6.2° and parallel light of 43.8° so that a reproduction angle for one beam equal is 0°, and a reproduction angle for the other beam is in the range of 41.8°~60.1°.

Thereafter, the hologram sheet is completed by development and other operations. Thus, the hologram sheet has the entrance hologram 31, the total reflection hologram 33, the exit hologram 41, and the exit hologram 42, as integral parts. The total reflection hologram 33 is located between the entrance hologram 31 and the exit hologram 41, and the exit hologram 41 is located between the total reflection hologram 33 and the exit hologram 42.

Then, an interference pattern for the entrance hologram 32 of transmission type is formed in another 10 mm×4 mm light sensitive film. The interference pattern for the entrance hologram 32 is formed in by irradiating first and second beams, respectively, onto one and the same surface of the light sensitive film in the same manner. The first and second beams are produced by dividing an original laser beam of 647 nm. By using a glass block, the first and second beams are directed in the form of divergent light of an incident angle of 6.2° and parallel light of 43.8° so that a reproduction angle for one beam equal is 0°, and a reproduction angle for the other beam is in the range of 41.8°~60.1°. Thereafter, the transmission type entrance hologram 32 is completed by development and other operations.

Then, a laminated hologram sheet is formed by superposing the entrance hologram 32 on the entrance hologram 31. The laminated hologram sheet has the entrance holograms 31 and 32, the total reflection hologram 33 and the exit holograms 41 and 42.

This hologram sheet is affixed to an inner surface of an inside glass sheet 11, and the inside glass sheet 11 is bonded together with an outside glass sheet 12 by an interlayer film 13 of polyvinyl butyral or the like to form a laminated glass plate. The hologram sheet is interposed between the inside glass layer 11 and the interlayer film 13. The light emitting device 50 and the light receiving devices 61 and 62 are fixed to the laminated glass plate, and the laminated glass plate is installed as a windshield, in a front windshield opening of a vehicle body. The light emitting device 50 is connected through lead conductors to a power source, and the light receiving devices 61 and 62 are connected to a sensing circuit.

When, in this rain and dew sensor, sensing light is introduced from the light emitting device 50 into the laminated glass plate 1, part of the sensing light is diffracted by the entrance hologram 31 as dew sensing light back into the inside glass layer 11, and the remaining part passes through the entrance hologram 31 and enters the entrance hologram 32 as rain sensing light. The dew sensing light advances in the inside glass layer 11 by total reflection between the inside glass surface and the total reflection hologram 33, and is redirected by the exit hologram 41 toward the light receiving device 61. The rain sensing light advances in the outside glass layer 12 by total reflection between the outside glass surface and the total reflection hologram 33, and is redirected by the exit hologram 42 toward the light receiving device 62.

When there are no raindrops on the outside glass surface, the rain sensing light is totally reflected between the outside glass surface of the outside glass layer 12 and the total reflection hologram 33, and received by the light receiving device 62 with no or little attenuation. When raindrops are on the outside glass surface, part or all of the sensing light enters a raindrop or raindrops, and scatters, so that the rain sensing light received by the light receiving device 62 is reduced to zero or a very small level. When there are no dewdrops on the inside glass surface, the dew sensing light is totally reflected between the inside glass surface of the inside glass layer 11 and the total reflection hologram 33, and received by the light receiving device 61 with no or little attenuation. When dew is formed on the inside glass surface, part or all of the sensing light enters the dew, and scatters, so that the dew sensing light received by the light receiving device 61 is reduced to zero or a very small level.

The sensing circuit can accurately detect a raindrop by comparing the absolute value of the quantity of the rain sensing light received by the light receiving device 62, with a reference value corresponding to a normal quantity obtained in the absence of rain. Similarly, the sensing circuit can accurately detect dew by comparing the absolute value of the quantity of the dew sensing light received by the light receiving device 61, with a reference value corresponding to a normal quantity obtained in the absence of dew.

Figure 12:
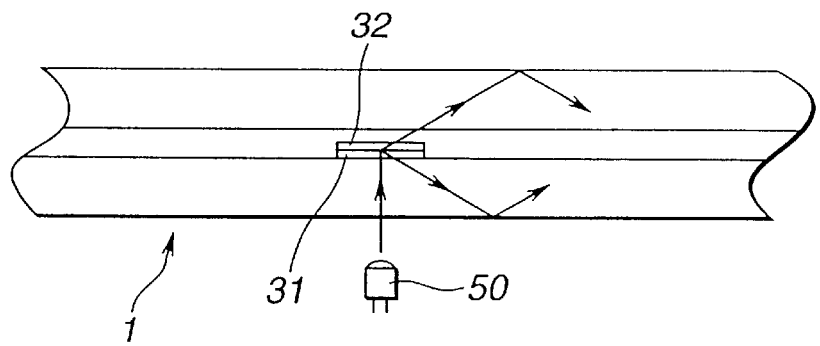
FIG. 12 is a schematic sectional view showing a first light entrance system which can be employed in the ninth example of FIG. 9 and similar examples.

The sensor of FIG. 9 employs a light entrance system shown in FIG. 12. However, it is optional to replace the light entrance system of FIG. 12 by any one of systems shown in FIGS. 13~15.

Figure 13:
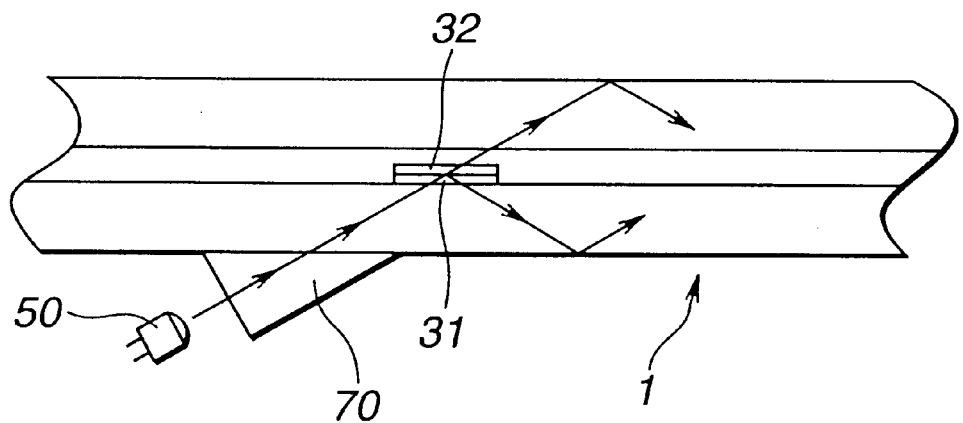
FIG. 13 is a schematic sectional view showing a second light entrance system which can substitute for the system of FIG. 12.

In the system of FIG. 13, sensing light is introduced into the glass plate 1 through a prism 70 so that the sensing light enters at an angle of total reflection, and the sensing light is divided into rain sensing light and dew sensing light by entrance holograms 31 and 32.

Figure 14:
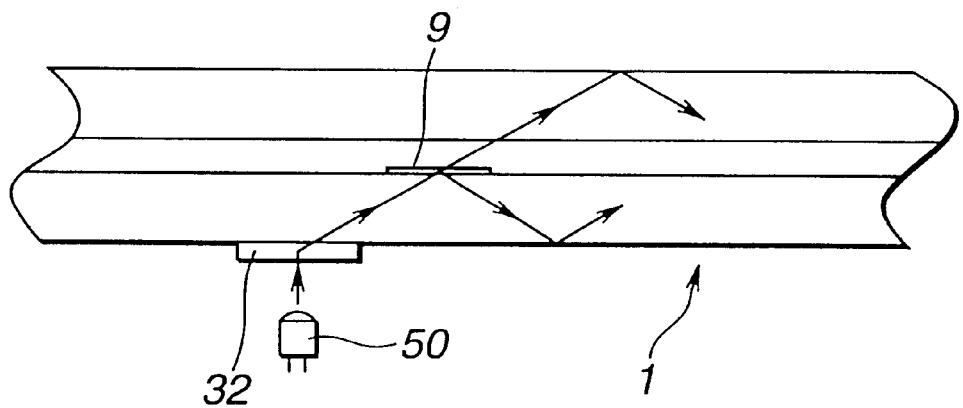
FIG. 14 is a schematic sectional view showing a third light entrance system which can substitute for the system of FIG. 12.

In the system of FIG. 14, sensing light is introduced into the glass plate 1 through an entrance hologram 32 on the inside glass surface, and the sensing light is divided into rain sensing light and dew sensing light by a half mirror 9 interposed between the inside and outside glass layers 11 and 12.

Figure 15:
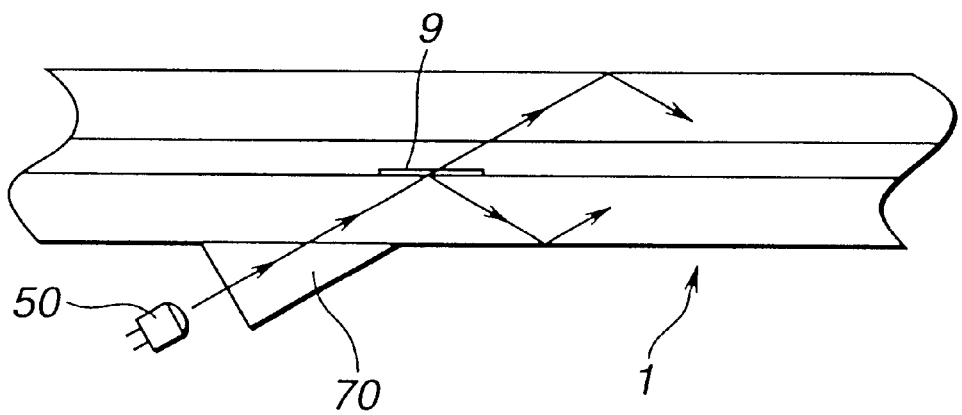
FIG. 15 is a schematic sectional view showing a fourth light entrance system which can substitute for the system of FIG. 12.

The system of FIG. 15 employs a prism 70 as in the example of FIG. 13, and a half mirror 9 as in the example of FIG. 14.

PRACTICAL EXAMPLE 11

As shown in FIG. 10, a rain and dew sensor of an eleventh practical example employs first and second light emitting devices 51 and 52 for emitting dew sensing light and rain sensing light, respectively. A first entrance hologram 31 is attached to the inside glass surface for redirecting the dew sensing light, and a second entrance hologram 32 is interposed between the inside and outside glass layers 11 and 12, for redirecting the rain sensing light. A first exit hologram 41 is attached to the inside glass surface, for redirecting the dew sensing light reflected between the inside glass surface and a total reflection hologram 33, to a first light receiving device 61. A second exit hologram 42 is interposed between the inside and outside glass layers 11 and 12, for redirecting the rain sensing light reflected between the outside glass surface and the total reflection hologram 33, to a second light receiving device 62.

The first and second entrance holograms 31 and 32, and the first and second exit holograms 41 and 42 are all transmission holograms, each of which can be formed by irradiating first and second beams, respectively, onto the same surface of a light sensitive film. By using a glass block, the first and second beams are directed in the form of divergent light of an incident angle of 6.2° and parallel light of 43.8° in the case of the entrance holograms 31 and 32, and in the form of convergent light of an incident angle of 6.2° and parallel light of 43.8° in the case of the exit holograms 41 and 42, so that a reproduction angle for one beam equal is 0°, and a reproduction angle for the other beam is in the range of 41.8°~60.1°.

PRACTICAL EXAMPLE 12

Figure 11A:
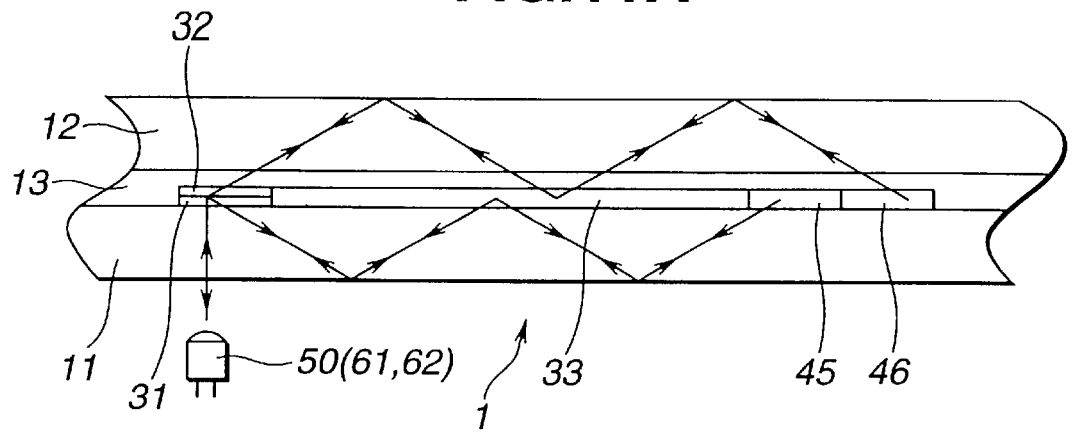
FIGS. 11A and 11B are, respectively, schematic sectional view and plan view for showing a part of a windshield glass plate in a twelfth practical example.
Figure 11B:
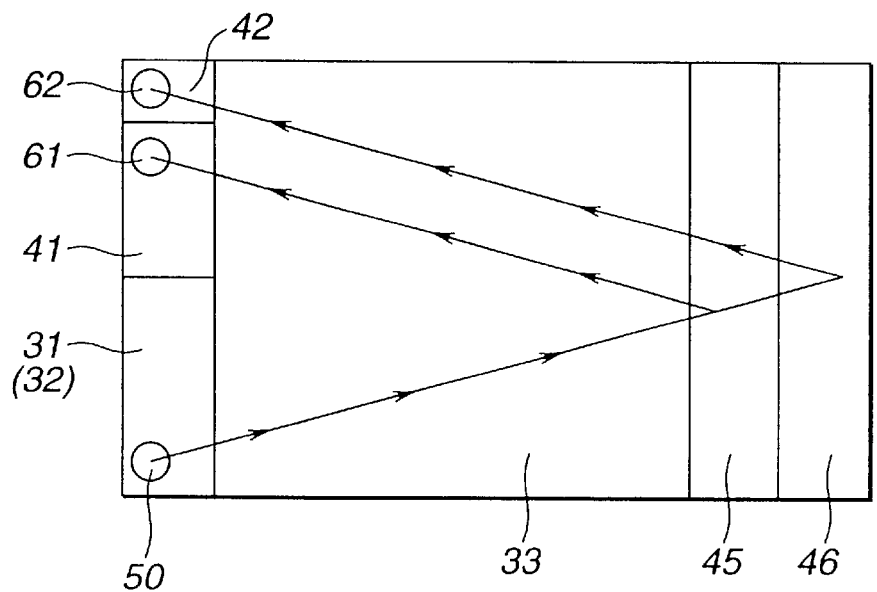

As shown in FIG. 11B, a single light emitting device 50 and first and second light receiving devices 61 and 62 are aligned in a first zone, first and second return holograms 45 and 46 are arranged in a second zone, and a total reflection hologram 33 is formed in an intermediate zone located between the first and second zones. Entrance holograms 31 and 31 and exit holograms 41 and 42 are provided in the first zone. As shown in FIGS. 11A and 11B, the holograms 31, 32, 33, 41, 42, 45, 46 are formed in a hologram sheet, and the entrance hologram 32 is superposed on the entrance hologram 31 to form a laminated hologram sheet. This hologram sheet has a first sheet section corresponding to the first zone, and the entrance and exit holograms 31, 32, 41 and 42 are all formed in the first sheet section. The total reflection hologram 33 is formed between the first sheet section and the return hologram 45 which is between the total reflection hologram 33 and the return hologram 46. In the first sheet section, the exit hologram 41 is formed between the entrance hologram 31 and the exit hologram 42.

The return hologram 45 functions to fold a light path of the dew sensing light so that the dew sensing light path consists of a first segment extending from the entrance hologram 31 to the return hologram 45 by total reflection between the inside glass surface and the total reflection hologram 33, and a second segment extending from the return hologram 45 to the exit hologram 41 by total reflection between the inside glass surface and the total reflection hologram 33.

The return hologram 46 functions to fold a light path of the rain sensing light so that the rain sensing light path consists of a first segment extending from the entrance hologram 32 to the return hologram 46 by total reflection between the outside glass surface and the total reflection hologram 33, and a second segment extending from the return hologram 46 to the exit hologram 42 by total reflection between the outside glass surface and the total reflection hologram 33.

The first and second segments of each of the dew sensing and rain sensing light paths are coincident with each other in the cross sectional view as shown in FIG. 11A, and form an angle (an acute angle in this example) in the plan view as shown in FIG. 11B. The return holograms 45 and 46 are formed to have such a pattern for returning the respective sensing light in this way.

The exit holograms 41 and 42 function in the same manner as the entrance holograms 31 and 32, but in the opposite light travel direction. Since the first and second segments differ from each other, the exit holograms 41 and 42 are preferably made broader in this example than in the tenth and eleventh practical examples.

Figure 16:
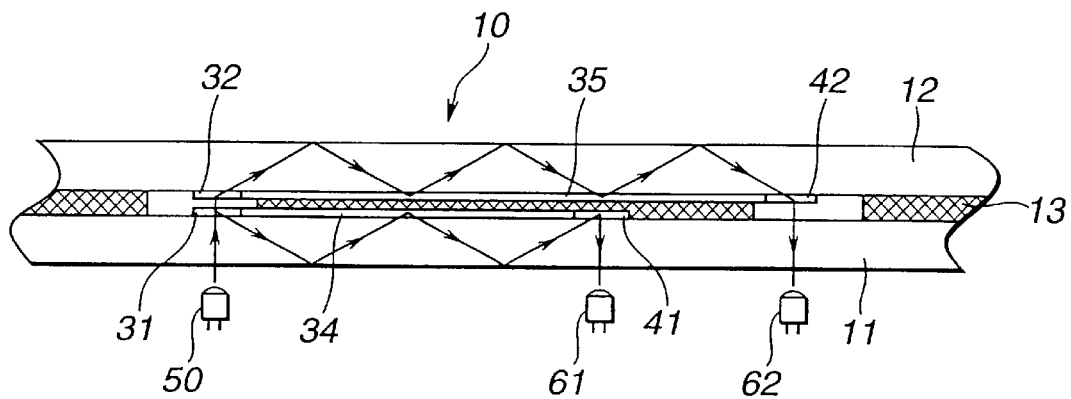
FIG. 16 is a schematic sectional view showing a part of a windshield glass plate in a thirteenth practical example according to the present invention.
Figure 17:
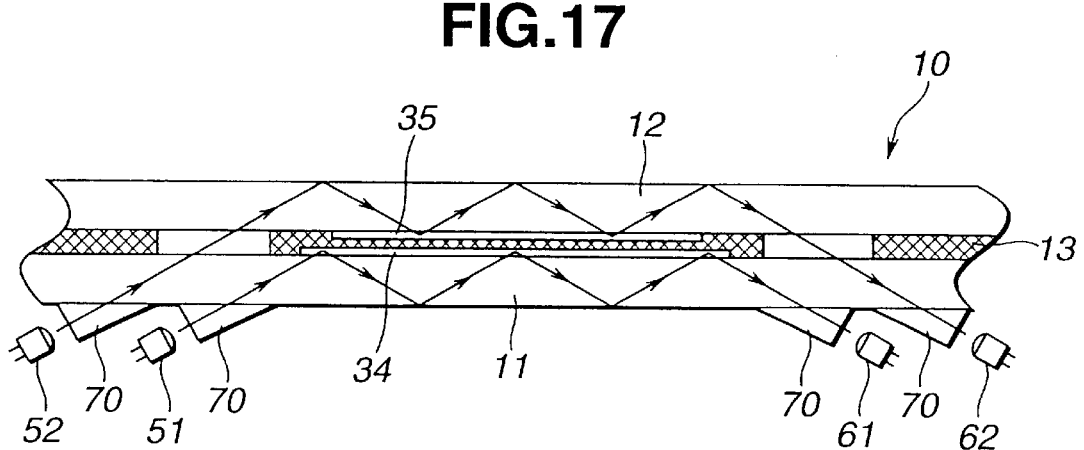
FIG. 17 is a schematic sectional view showing a part of a windshield glass plate in a fourteenth practical example according to the present invention.
Figure 18:
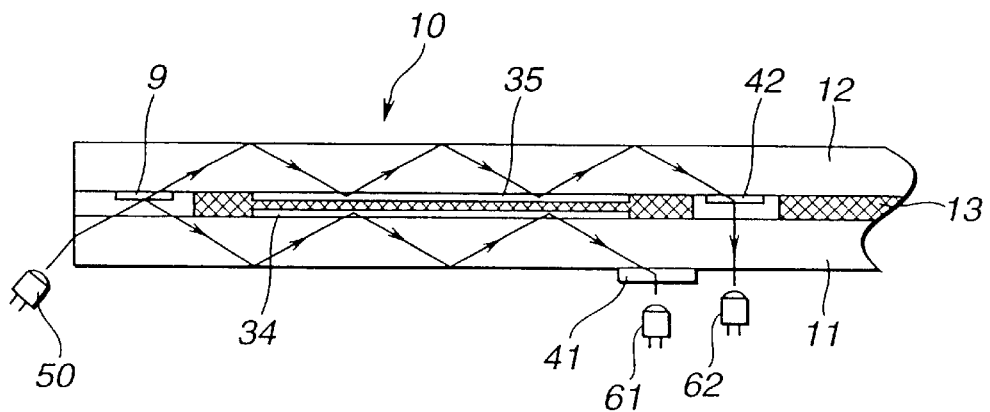
FIG. 18 is a schematic sectional view showing a part of a windshield glass plate in a fifteenth practical example according to the present invention.

FIGS. 16~18 show thirteenth through fifteenth practical examples designed to prevent dew and rain sensing light from being absorbed by a shade band in a windshield laminated glass plate.

PRACTICAL EXAMPLE 13

As shown in FIG. 16, a transparent plate is a laminated glass plate or panel 10 for a windshield of a vehicle. A rain and dew sensor has a single light emitting device 50, two entrance holograms 31 and 32, two exit holograms 41 and 42, and two light receiving devices 61 and 62. A first total reflection hologram 34 defines a total reflection path of dew sensing light with the inside glass surface. A second total reflection hologram 35 defines a total reflection path of rain sensing light with the outside glass surface. A tinted shade band 13 is between the first and second total reflection holograms 34 and 35. The shade band 13 has a transparent entrance opening (or non-tinted region) for allowing rain sensing light to travel from the inside glass layer 11 to the outside glass layer 12, and a transparent exit opening (or non-tinted region) for allowing the rain sensing light to travel from the outside glass layer 12 to the inside glass layer 12.

The light emitting device 50 is an AlGaAs near-infrared light emitting diode, and the light receiving devices 61 and 62 are germanium devices. The holograms, 31, 32, 34, 35, 41 and 42 are prepared in the following manner.

First, a first interference pattern for the first entrance hologram 31 is formed in a 5 mm×4 mm left side region of a 5 mm×14 mm light sensitive film. The light sensitive film used in this example is a photopolymer film having a 25 μm thick coating layer of photopolymer polymer spread on a resin film (such as Dupont OmniDex-352). The first interference pattern having a diffraction efficiency of about 50% is formed in the 10 mm×4 mm left side region, by irradiating first and second beams, respectively, onto first and second surfaces of the light sensitive film at a reduced level of light exposure with an optical system including a laser oscillator for producing light of 647 nm, a beam splitter, convex lenses and mirrors, in the state in which the remaining region of the light sensitive film is masked, and only the left side region is bared for exposure. The first and second beams are produced by dividing an original laser beam. By using a glass block, the first and second beams are directed to the first and second surfaces of the light sensitive film, in the form of divergent light having an incident angle of 21.4° and parallel light having an incident angle of 71.4° so that a reproduction angle for one beam is equal to 0°, and a reproduction angle for the other beam is equal to an angle in a range of 41.8°~60.1°.

Then, an interference pattern for the first total reflection hologram 34 is formed in an 5 mm×6 mm intermediate region of the light sensitive film with 5 mm×4 mm left side and right side regions being masked. The interference pattern for the total reflection hologram 34 is formed in the intermediate region by irradiating first and second beams, respectively, onto the first and second surfaces of the light sensitive film in the same manner. The first and second beams are produced by dividing an original laser beam of 647 nm. By using a glass block, the first and second beams are directed to the intermediate region, in the form of parallel light of 60.7° and parallel light of 60.7° so that a reproduction angle for one beam equal is 50.0°, and a reproduction angle for the other beam is 50.0°.

Then, an interference pattern for the exit hologram 41 is formed in the 5 mm×4 mm right side region of the light sensitive film, with the remaining regions being masked. The interference pattern for the exit hologram 41 is formed in by irradiating first and second beams, respectively, onto the first and second surfaces of the light sensitive film in the same manner. The first and second beams are produced by dividing an original laser beam of 647 nm. By using a glass block, the first and second beams are directed in the form of convergent light of an incident angle of 21.4° and parallel light of 71.4° so that a reproduction angle for one beam equal is 0°, and a reproduction angle for the other beam is in the range of 41.8°~60.1°.

The first hologram sheet is completed by normal development operation. The first hologram sheet has, as integral parts thereof, the entrance hologram 31, the exit hologram 41 and the first total reflection hologram 34 formed between the entrance and exit hologram 31 and 41.

Furthermore, an interference pattern for the second entrance hologram 32 of a transmission type is formed in a 5 mm×4 mm left side region of a 5 mm∴19 mm light sensitive film. The light sensitive film used in this example is a photopolymer film having a 25 μm thick coating layer of photopolymer polymer spread on a resin film (such as Dupont OmniDex-352). The transmission entrance hologram 32 is formed by irradiating first and second beams, respectively, onto the same surface of the light sensitive film in the same manner. The first and second beams are produced by dividing an original laser beam of 647 nm. By using a glass block, the first and second beams are directed to the light sensitive film, in the form of divergent light having an incident angle of 6.2° and parallel light having an incident angle of 43.8° so that a reproduction angle for one beam is equal to 0°, and a reproduction angle for the other beam is equal to an angle in a range of 41.8°~60.1°.

Then, an interference pattern for the second total reflection hologram 35 is formed in an 5 mm×11 mm intermediate region of the light sensitive film with 5 mm×4 mm left side and right side regions being masked. The interference pattern for the total reflection hologram 35 is formed in the intermediate region by irradiating first and second beams, respectively, onto first and second surfaces of the light sensitive film in the same manner. The first and second beams are produced by dividing an original laser beam of 647 nm. By using a glass block, the first and second beams are directed in the form of parallel light of 60.7° and parallel light of 60.7° so that a reproduction angle for one beam equal is 50.0°, and a reproduction angle for the other beam is 50.0°.

Then, an interference pattern for the second exit hologram 42 is formed in the 5 mm×4 mm right side region of the light sensitive film, with the remaining regions being masked. The interference pattern for the exit hologram 42 is formed by irradiating first and second beams, respectively, onto the same surface of the light sensitive film in the same manner. The first and second beams are produced by dividing an original laser beam of 647 nm. By using a glass block, the first and second beams are directed in the form of convergent light of an incident angle of 6.2° and parallel light of 43.8° so that a reproduction angle for one beam equal is 0°, and a reproduction angle for the other beam is in the range of 41.8°~60.1°.

Thus, the second hologram sheet is completed by normal development operation. The second hologram sheet has, as integral parts thereof, the entrance hologram 32, the exit hologram 42 and the second total reflection hologram 35 formed between the entrance and exit hologram 32 and 42.

The first hologram sheet is affixed to an inner surface of the inside glass sheet 11, and the second hologram sheet is affixed to an inner surface of the outside glass sheet 12. The inside and outside glass sheets 11 and 12 are bonded together by an interlayer film 13 of polyvinyl butyral to form a laminated glass plate. The interlayer film 13 has a tinted shade band (as shown by hatching in FIG. 16). The first hologram sheet is interposed between the inside glass layer 11 and the interlayer film 13, and the second hologram sheet is interposed between the outside glass layer 12 and the interlayer film 13. The shade band 13 has the transparent entrance opening for allowing rain sensing light to travel from the inside glass layer 11 to the outside glass layer 12, and the transparent exit opening for allowing the rain sensing light to travel from the outside glass layer 12 to the inside glass layer 12. Each transparent opening is a non-tinted region of the interlayer film 13.

The light emitting device 50 and the light receiving devices 61 and 62 are fixed to the laminated glass plate, and the laminated glass plate is installed as a windshield, in a front windshield opening of a vehicle body. The light emitting device 50 is connected through lead conductors to a power source, and the light receiving devices 61 and 62 are connected to a sensing circuit.

When, in this rain and dew sensor, sensing light is introduced from the light emitting device 50 into the laminated glass plate 10, part of the sensing light is diffracted by the entrance hologram 31 as dew sensing light back into the inside glass layer 11, and the remaining part passes through the entrance hologram 31 and enters the entrance hologram 32 as rain sensing light. The second entrance hologram 32 diffracts the rain sensing light so that the rain sensing light advances in the outside glass layer 12 by total reflection. The dew sensing light advances in the inside glass layer 11 by total reflection between the inside glass surface and the total reflection hologram 34, and is redirected by the exit hologram 41 toward the light receiving device 61. The rain sensing light advances in the outside glass layer 12 by total reflection between the outside glass surface and the total reflection hologram 35, and is redirected by the exit hologram 42 toward the light receiving device 62. The non-tinted transparent regions in the shade band define a light path of the rain sensing light which does not pass through the tinted region, so that the sensing light reaches the light receiving device 62 with little attenuation.

When raindrops are on the outside glass surface, part or all of the sensing light enters a raindrop or raindrops, and scatters, so that the rain sensing light received by the light receiving device 62 is reduced to zero or a very small level. When dew is formed on the outside glass surface, part or all of the sensing light enters the dew, and scatters, so that the dew sensing light received by the light receiving device 61 is reduced to zero or a very small level.

The sensing circuit can accurately detect a raindrop by comparing the absolute value of the quantity of the rain sensing light received by the light receiving device 62, with a reference value corresponding to a normal quantity obtained in the absence of rain. Similarly, the sensing circuit can accurately detect dew by comparing the absolute value of the quantity of the dew sensing light received by the light receiving device 61, with a reference value corresponding to a normal quantity obtained in the absence of dew.

The thirteenth example can employ any of the entrance systems shown in FIGS. 12~15.

PRACTICAL EXAMPLE 14

As shown in FIG. 17, there are provided a dew sensing system including a first light emitting device 51, a first entrance prism 70, a first hologram sheet having only a first total reflection hologram 34, a first exit prism 70 and a first light receiving device 61, and a rain sensing system including a second light emitting device 52, a second entrance prism 70, a second hologram sheet having only a second total reflection hologram 35, a second exit prism 70 and a second light receiving device 62. The first and second total reflection holograms 34 and 35 are formed so as to have the same optical properties as in the example of FIG. 16.

PRACTICAL EXAMPLE 15

As shown in FIG. 18, a single light emitting device 50 is aimed at an end surface of a laminated glass plate 10, and a half mirror 9 is interposed between the inside and outside glass layers 11 and 12, for dividing the sensing light from the light emitting device 50 into dew sensing light beam and rain sensing light beam. A dew sensing system includes a first hologram sheet having only a first total reflection hologram 34, a first exit hologram 41 which, in this example, is fixed to the inside glass surface, and a first light receiving device 61. A rain sensing system includes a second hologram sheet having only a second total reflection hologram 35, a second exit hologram 42 interposed between the inside and outside glass layers 11 and 12, and a second light receiving device 62. The first and second total reflection holograms 34 and 35 and the exit holograms 41 and 42 can be formed so as to have the same optical properties as in the example of FIG. 16.

Figure 19:
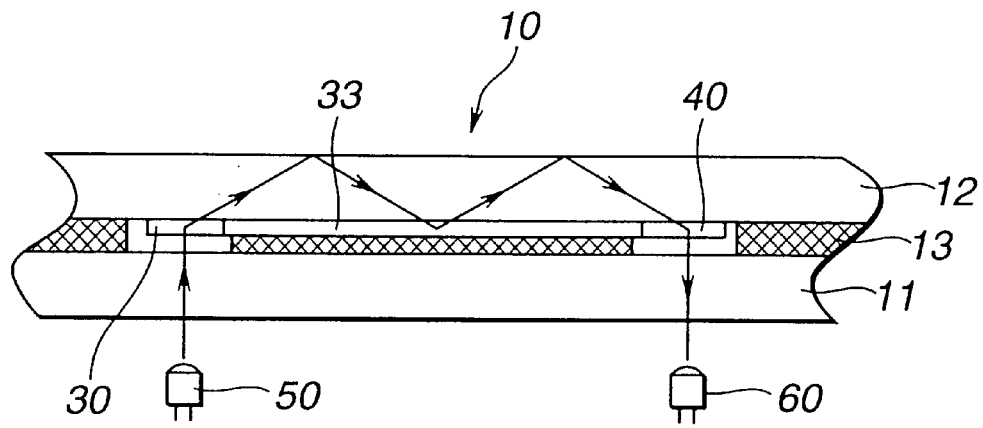
FIG. 19 is schematic sectional view showing a part of a windshield glass plate in a sixteenth practical example according to the present invention.
Figure 20:
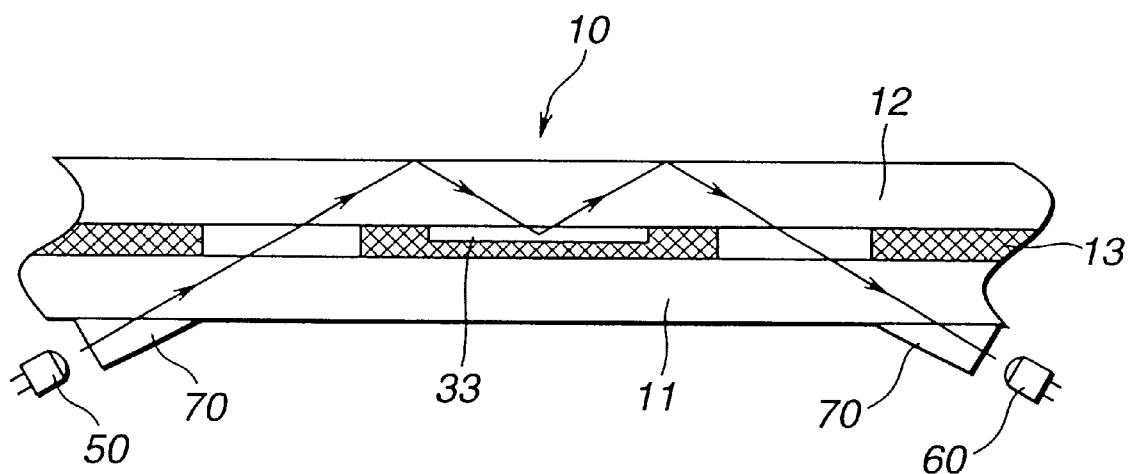
FIG. 20 is a schematic sectional view showing a part of a windshield glass plate in a seventeenth practical example according to the present invention.
Figure 21:
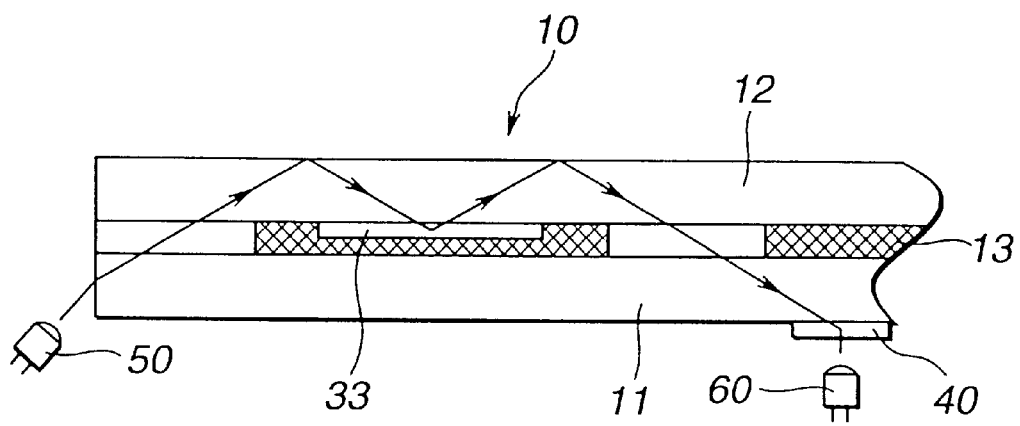
FIG. 21 is a schematic sectional view showing a part of a windshield glass plate in an eighteenth practical example according to the present invention.

FIGS. 19~21 show sixteenth through eighteenth practical examples.

PRACTICAL EXAMPLE 16

As shown in FIG. 19, a transparent plate is a laminated glass plate or panel 10 for a windshield of a vehicle, and a sensor of the sixteenth practical example has only a rain sensing system including a light emitting device 50, a hologram sheet having an entrance hologram 30, a total reflection hologram 33 and an exit hologram 40, and a light receiving device 60.

The light emitting device 50 is an AlGaAs near-infrared light emitting diode, and the light receiving device 60 is a germanium device. The holograms 30, 33 and 40 are prepared in the following manner.

First, an interference pattern for the entrance hologram 30 is formed in a 5 mm×4 mm left side region of a 5 mm×14 mm light sensitive film. The light sensitive film used in this example is a photopolymer film having a 25 μm thick coating layer of photopolymer polymer spread on a resin film (such as Dupont OmniDex-352). The interference pattern is formed by irradiating first and second beams, respectively, onto the same surface of the light sensitive film with an optical system including a laser oscillator for producing light of 647 nm, a beam splitter, convex lenses and mirrors, in the state in which the remaining region of the light sensitive film is masked, and only the left side region is bared for exposure. The first and second beams are produced by dividing an original laser beam. By using a glass block, the first and second beams are directed to the light sensitive film, in the form of divergent light having an incident angle of 6.2° and parallel light having an incident angle of 43.8° so that a reproduction angle for one beam is equal to 0°, and a reproduction angle for the other beam is equal to an angle in a range of 41.8°~60.1°.

Then, an interference pattern for the total reflection hologram 33 is formed in an 5 mm×6 mm intermediate region of the light sensitive film with 5 mm×4 mm left side and right side regions being masked. The interference pattern for the total reflection hologram 33 is formed in the intermediate region by irradiating first and second beams, respectively, onto the light sensitive film in the same manner. The first and second beams are produced by dividing an original laser beam of 647 nm. By using a glass block, the first and second beams are directed to the same surface of the light sensitive film in the form of parallel light of 60.7° and parallel light of 60.7° so that a reproduction angle for one beam equal is 50°, and a reproduction angle for the other beam is 50°.

Then, an interference pattern for the exit hologram 40 is formed in the 5 mm×4 mm right side region of the light sensitive film, with the remaining regions being masked. The interference pattern for the exit hologram 40 is formed by irradiating first and second beams, respectively, onto the same surface of the light sensitive film in the same manner. The first and second beams are produced by dividing an original laser beam of 647 nm. By using a glass block, the first and second beams are directed in the form of convergent light of an incident angle of 6.2° and parallel light of 43.8° so that a reproduction angle for one beam equal is 0°, and a reproduction angle for the other beam is in the range of 41.8°~60.1°.

The thus-produced hologram sheet is completed by normal development operation. The hologram sheet has, as integral parts thereof, the entrance hologram 30, the exit hologram 40 and the total reflection hologram 33 formed between the entrance and exit hologram 30 and 40.

The hologram sheet is affixed to an inner surface of the outside glass sheet 12. The inside and outside glass sheets 11 and 12 are bonded together by an interlayer film 13 of polyvinyl butyral to form a laminated glass plate. The interlayer film 13 has a tinted shade band (as shown by hatching in FIG. 19 ). The hologram sheet is interposed between the outside glass layer 12 and the interlayer film 13. The shade band has a transparent entrance opening for allowing rain sensing light to travel from the inside glass layer 11 to the outside glass layer 12, and a transparent exit opening for allowing the rain sensing light to travel from the outside glass layer 12 to the inside glass layer 12. Each transparent opening is a non-tinted region of the interlayer film 13.

The light emitting device 50 and the light receiving device 60 are fixed to the laminated glass plate, and the laminated glass plate is installed as a windshield, in a front windshield opening of a vehicle body.

When, in this rain sensor, sensing light is introduced from the light emitting device 50 into the laminated glass plate 10, the entrance hologram 30 diffracts the rain sensing light so that the rain sensing light advances in the outside glass layer 12 by total reflection between the outside glass surface and the total reflection hologram 33, and is redirected by the exit hologram 40 toward the light receiving device 60. The non-tinted transparent regions in the shade band define a light path of the rain sensing light which does not pass through the tinted region, so that the sensing light reaches the light receiving device 62 with little attenuation.

When raindrops are on the outside glass surface, part or all of the sensing light enters a raindrop or raindrops, and scatters, so that the rain sensing light received by the light receiving device 62 is reduced to zero or a very small level.

The sensing circuit connected with the light receiving device 60 can accurately detect a raindrop by comparing the absolute value of the quantity of the rain sensing light received by the light receiving device 60, with a reference value corresponding to a normal quantity obtained in the absence of rain.

PRACTICAL EXAMPLE 17

As shown in FIG. 20, the entrance and exit holograms 30 and 40 in the rain sensing system of FIG. 19 are replaced by entrance and exit prisms 70 attached to the inside surface of the laminated glass plate 10. The hologram sheet has only a total reflection hologram 33 which can be formed in the same manner as the total reflection hologram 33 of FIG. 19.

PRACTICAL EXAMPLE 18

As shown in FIG. 21, a light emitting device 50 is aimed at an end surface of a laminated glass plate 10, and an exit hologram 40 is attached to the inside surface of the laminated glass plate 10. A total reflection hologram 33 is interposed between the outside glass layer 12 and the interlayer film 13. The holograms 33 and 40 can be formed in the same manner as in the example of FIG. 19.

PRACTICAL EXAMPLE 19

Figure 22A:
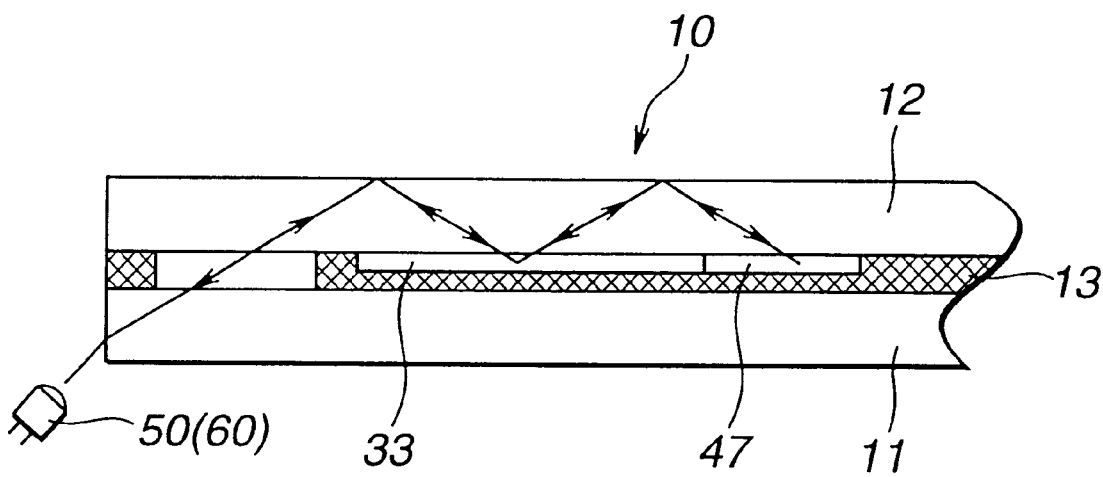
FIGS. 22A and 22 are respectively, schematic sectional view and plan view for showing a part of a windshield glass plate in a nineteenth practical example.
Figure 22B:
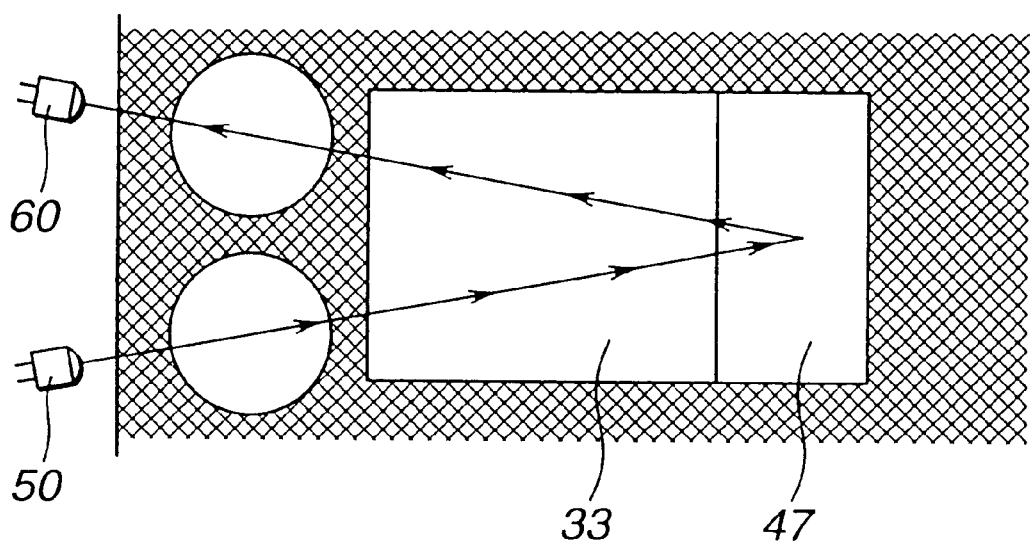

As shown in FIGS. 22A and 22B, a light emitting device 50 and a light receiving device 60 are both aimed at an end surface of a laminated glass plate 10. A hologram sheet having, as integral parts, a total reflection hologram 33 and a return hologram 47 is interposed between the outside glass layer 12 and the shade band zone of the interlayer film 13. The shade band is formed with an entrance transparent opening and an exit transparent opening. The return hologram 47 functions to fold a light path so that the rain sensing light path consists of a first segment extending from the light emitting device 50 through the entrance opening to the return hologram 47 and a second segment extending from the return hologram 47 through the exit opening toward the light receiving hologram 60. The first and second segments are coincident with each other in the cross sectional view of FIG. 22A, and the first and second segment appear as two straight line segments forming an angle in the plan view of FIG. 22B. In each of the first and second segments, the rain sensing light is totally reflected between the outside glass surface and the total reflection hologram 33.

A hologram exposure system according to the present invention is explained with reference to FIGS. 23~30.

FIGS. 23, 25, 26 and 27 are schematic views showing exposing systems of twentieth through twenty-fourth practical examples according to the present invention.

PRACTICAL EXAMPLE 20

FIG. 23 shows a hologram exposing system in a twentieth practical example of the present invention. This exposing system is designed to produce an entrance hologram and an exist hologram to be attached to a vehicle's windshield for sensing raindrops.

A glass substrate plate 3 is coated with a film 24 of light-sensitive material, and formed into a dry plate. The thickness of the glass plate 3 of this example is a half (about 2.4 mm) of the thickness (normally about 4.8 mm) of a windshield glass plate of a vehicle.

First and second prisms 71 and 72 are put in contact with the light sensitive film 24 of the dry plate.

The first prism 71 has a first face 73 parallel to the photosensitive film 24, and a second face 74 inclined with respect to the photosensitive film 24. The second prism 72 has a first face 75 parallel to the photosensitive film 24, and a second face 76 inclined with respect to the photosensitive film 24. Each of the first and second prisms 71 and 72 further has a contact face entirely contacting with the light sensitive film 24 of the dry plate.

A first reference beam R1 is introduced from the first face 73 of the first prism 71 through a first region (21) of the photosensitive film 24 into the glass plate 3. The first reference beam R1 passes through the glass plate 3 and exits the glass plate 3 from a back surface of the glass plate 3. A first object beam S1 is introduced from the second face 74 of the first prism 71 through the first region (21) of the light sensitive film 24. In the glass plate 3, the first object beam is totally reflected three times in the glass plate 3, and exits the glass plate 3, as a second reference beam R2, through a second region (22) of the light sensitive film 24 and the second face 76 of the second prism 72. A second object beam S2 enters the glass plate 3 from the back surface of the glass plate 3, and exits the glass plate 3 through the second region (22) of the light sensitive film 24 and the first face 75 of the second prism 72. The first object beam S1 is internally reflected twice by the back surface (internal reflection surface) of the glass plate 3.

This example employs a photopolymer holographic film (such as Dupont Omnidex 352) having a 0.2 mm thick base film, a 25 μm thick coating layer of light sensitive material such as photopolymer coated on the base film, and a cover film. First, the base film is peeled off, and the photopolymer film is applied, as the light sensitive film 24, to the glass plate 3 by pressing with a laminator.

Second, the first and second prisms 71 and 72 are put in contact with the light sensitive film 24 on the glass plate 3. The first face 73 of the first prism 71 is flat and extends in parallel to the contact surface which is put in contact with the light sensitive film 24. The second face 74 of the first prism 71 is flat and inclined with respect to the contact face. The angle formed between the second face 74 and the contact face of the first prism 71 is 60.0°. The first face 75 of the second prism 72 is flat and extends in parallel to the contact surface which is put in contact with the light sensitive film 24. The second face 76 of the second prism 72 is flat and inclined with respect to the contact face. The angle formed between the second face 76 and the contact face of the second prism 72 is 60.0°. The inclined second face 74 or 76 of each prism is formed by cutting and polishing.

Third, laser light of 532 nm is produced by a laser oscillator, and the laser beam is divided into three beams by an optical system having at least one beam splitter, convex lenses, and mirrors. The first beam is inlet to the inclined face 74 of the first prism 71 as the first object beam S1 from a normal direction approximately normal to the inclined surface 74. The second beam is inlet to the parallel face 73 of the first prism 71 from a normal direction approximately normal to the parallel face 73. The third beam is inlet, as the second object beam S2, from the back surface of the glass plate from its normal direction approximately normal to the back surface.

The first object beam S1 and the first reference beam R1 pass through each other and create an interference pattern which is recorded as a first hologram 21 in the first region of the light sensitive film 24. After transmission through the light sensitive film 24, the first object beam S1 reaches the back surface of the glass plate 3, reflects totally back from the glass plate back surface, and reaches an intermediate region 23 of the light sensitive film 24. In this example, the intermediate region 23 is preliminarily processed to make the intermediate region 23 insensitive so that no unwanted hologram is formed in the intermediate region. The beam reflects totally from a surface of the film 24 back toward the back surface of the glass plate 3 and reflects totally again from the back surface of the glass plate 3, passes through the second region of the light sensitive film 24 as the second reference beam R2, and emerges from the inclined face 76 of the second prism 72 into the air. The second object beam S2 and the second reference beam R2 meet each other and form an interference pattern which is recorded as the second hologram 22 in the second region of the light sensitive film 24.

It is preferable to deviate the incident direction of each laser beam to any surface of the prisms 71 and 72 or the glass plate 3, from the exact normal to that surface. The angle difference between the incident direction and the exact normal is about 1°. If a laser light is aimed at a plane of incidence in the exact normal direction, the light is reflected from the plane of incident, and returns to a laser source, making the laser beam unstable. The slight deviation of the incident beam from the normal prevents such undesired return of the laser light to the source.

Figure 24:
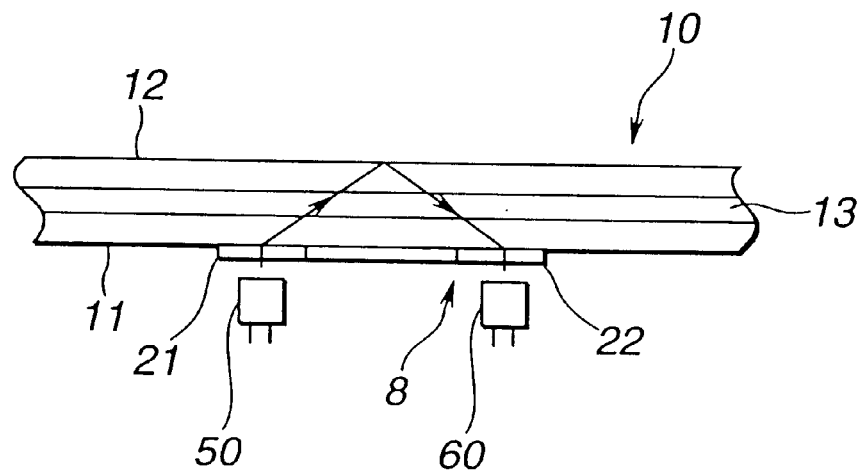
FIG. 24 is a schematic view showing a rain sensor using a hologram sheet produced by the exposing system of FIG. 23.

In this way, from the light sensitive film, the exposing system forms a hologram sheet 8 having the first and second holograms 21 and 22 separated from each other by the non-hologram intermediate region 23. The hologram sheet 8 is affixed, as shown in FIG. 24, to the inside surface of a laminated glass plate including 2 mm thick inside and outside glass layers 11 and 12 bonded together by an intermediate layer of polyvinyl butyral having a thickness of about 0.8 mm sandwiched between the inside and outside layers 11 and 12. The total thickness of the laminated glass plate is about 4.8 mm. A light emitting device 50 is fixed in front of the first hologram 21, and a light receiving device 60 is fixed in front of the second hologram 22 to form a rain sensor. Then, the laminated glass plate is installed in a front opening of a vehicle body of a motor vehicle, as a windshield. The thus-formed rain sensor shown in FIG. 24 can sense raindrop on the windshield of the vehicle in the same manner as the sensor of FIG. 1.

In the 20th practical example, it is possible to make the first and second holograms reflection type holograms by reversing the directions of the first reference beam R1 and the second object beam S2 while holding the directions of the first object beam S1 and the second reference beam R2 unchanged, or by reversing the directions of the first object beam S1 and the second reference beam R2 while holding the directions of the first reference beam R1 and the second object beam S2 unchanged. The thus-formed hologram sheet having the first and second reflection holograms can be used within a laminated glass plate, for example, between an outside glass layer and an inside glass layer.

PRACTICAL EXAMPLE 21

Figure 25:
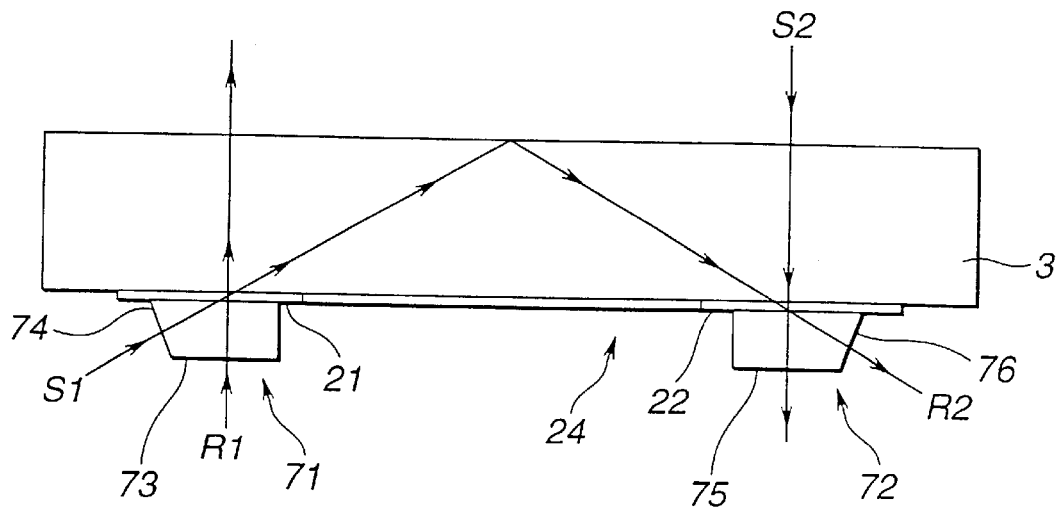
FIG. 25 is a schematic view showing an exposing system in a twenty-first practical example according to the present invention.

FIG. 25 shows a twenty-first practical example of the present invention. A glass plate 3 of this example has a thickness of 4.8 mm. The thickness of the glass plate 3 of FIG. 25 is twice as great as the thickness of the glass plate of FIG. 23 (so that the thickness of the glass plate 3 is equal to the thickness of a windshield glass plate). The first object beam S1 is totally reflected only once by the back surface of the glass plate 3, and let out from the second face 76 of the second prism 72 as the second reference beam R2. The total reflection path in the glass plate consists of a first oblique straight segment from the first region 21 of the light sensitive film 24 to the back surface of the glass plate and a second oblique straight segment from the back surface of the glass plate 3 to the second region of the light sensitive film 24. The total reflection path has only one internal total reflection point. In other respects, the exposure system of FIG. 25 is substantially the same as the exposure system of FIG. 23.

The 21st example does not require a process for making insensitive the intermediate region of the light sensitive film 24 between the first and second hologram regions 21 and 22. The intermediate region is located away from the total reflection path. The first and second prisms 71 and 72 may be integral parts of a single block.

PRACTICAL EXAMPLE 22

Figure 26:
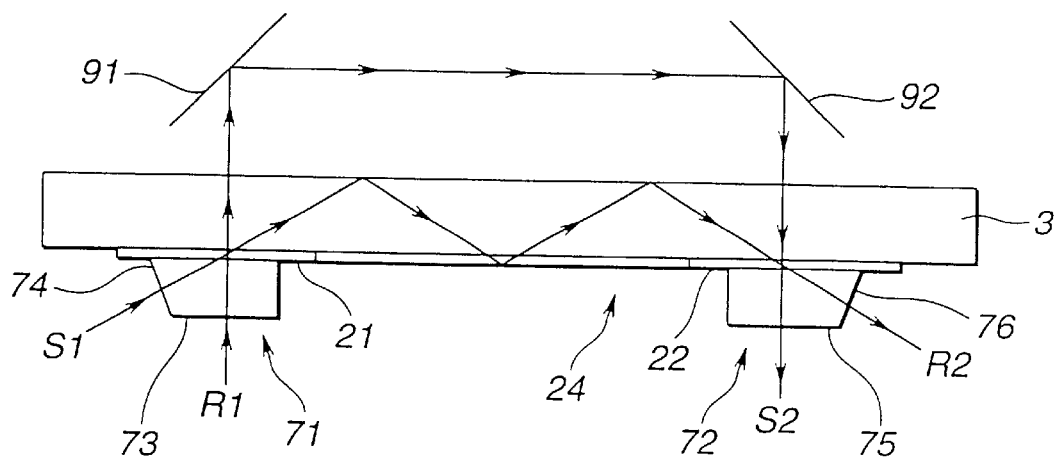
FIG. 26 is a schematic view showing an exposing system in a twenty-second practical example.

FIG. 26 shows a twenty-second practical example of the present invention. This example employs first and second mirrors 91 and 92 for defining a (rectangular) path of a single laser beam for serving as the first reference beam R1 and the second object beam S2.

The first and second mirrors 91 and 92 are provided on the back side of the glass plate 3. The first region of the light sensitive film 24 is positioned between the first mirror 91 and the first prism 71, and the second region of the light sensitive film 24 is positioned between the second mirror 92 and the second prism 72.

In this example, a first laser beam is inlet from the inclined face 74 of the first prism 71 as the first object beam S1, guided through a zigzag total reflection path in the glass plate 3, and outlet from the inclined face 76 of the second prism 72 as the second reference beam R2 as in the example of FIG. 23. A second laser beam enters the glass plate 3 through the parallel face 73 of the first prism 71 and the first region of the light sensitive film 24, as the first reference beam R1 to form the first hologram 21 with the first object beam S1, passes through the glass plate 3 toward the backside first mirror 91, changes the travel direction by reflection on the first mirror 91, toward the second backside mirror 92, changes the travel direction again by reflection on the second mirror 92 toward the second prism 72, and passes through the grass plate 3, the second region of the light sensitive film 24 and the parallel face 75 of the second prism, as the second object beam S2 to form the second hologram with the second reference beam R2.

PRACTICAL EXAMPLE 23

A twenty-third practical example according to the present invention is almost identical to the twentieth example of FIG. 23, and different only in that the thickness of the glass plate 3 is set equal to 2.0 mm so as to equal the thickness of an outside glass layer of a laminated glass plate, and in that the intermediate region is not subjected to the process of making insensitive a light sensitive film. A hologram sheet produced by this example can be used inside a laminated glass plate as shown in FIG. 2. With a hologram sheet produced by this example, it is possible to form a total reflection path of sensing light only in an outside glass layer on the outer side of a shade band. This arrangement can utilize the sensing light efficiently without suffering loss or reduction of the sensing light in the inside glass layer and the shade band, and thereby improve the accuracy in rain detection.

PRACTICAL EXAMPLE 24

Figure 27:
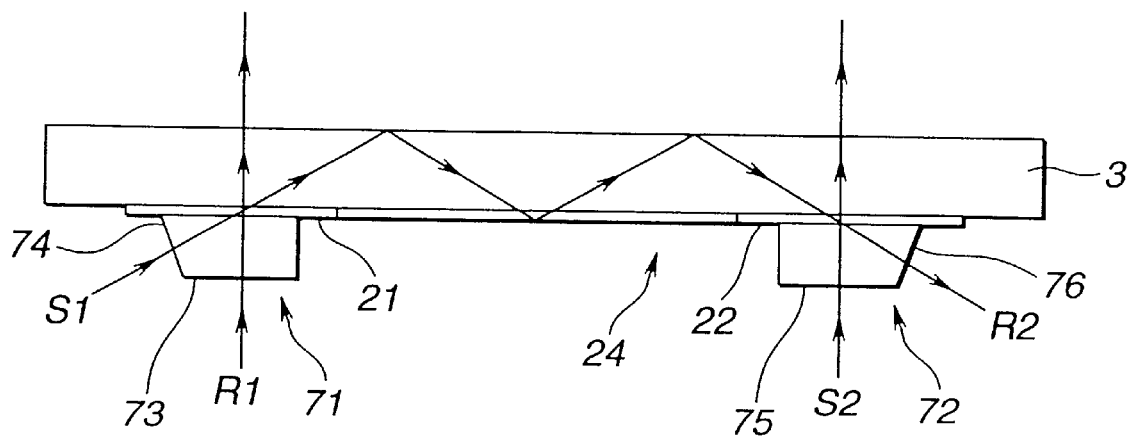
FIG. 27 is a schematic view showing an exposing system in a twenty-third practical example.

FIG. 27 shows a twenty-fourth practical example of the present invention. This example is for producing a hologram sheet used for a center high-mount stop lamp.

As shown in FIG. 27, the second object beam S2 enters the glass plate 3 from the light sensitive film 24 and exits the glass plate 3 from the backside surface. In this example, the oscillation wavelength of the laser is set equal to 647.1 nm. In other respects, the 24th example is substantially identical to the 20th example of FIG. 23. The thus-produced hologram sheet is attached to a rear glass panel of a vehicle, and there is provided, in front of the first hologram (entrance hologram), a red light source switched on and off together with a brake lamp of the vehicle. The red light emerges from the second hologram (exit hologram) to signal a braking condition rearwards to another vehicle. In this example, the hologram sheet serves as a high mount stop lamp.

Figure 28:
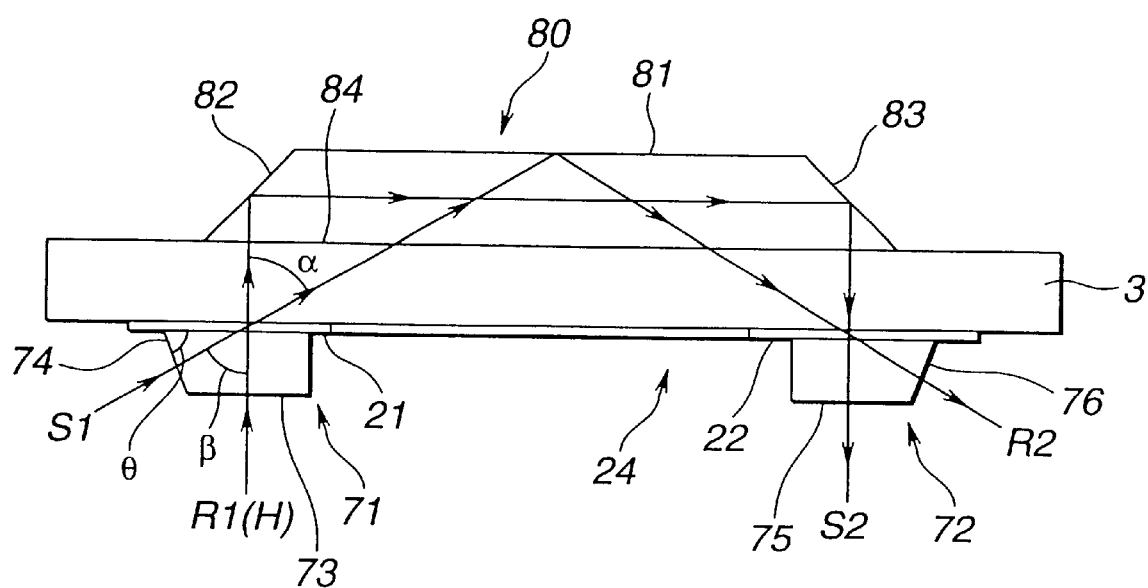
FIG. 28 is a schematic view showing an exposing system in a twenty-fourth practical example.
Figure 30:
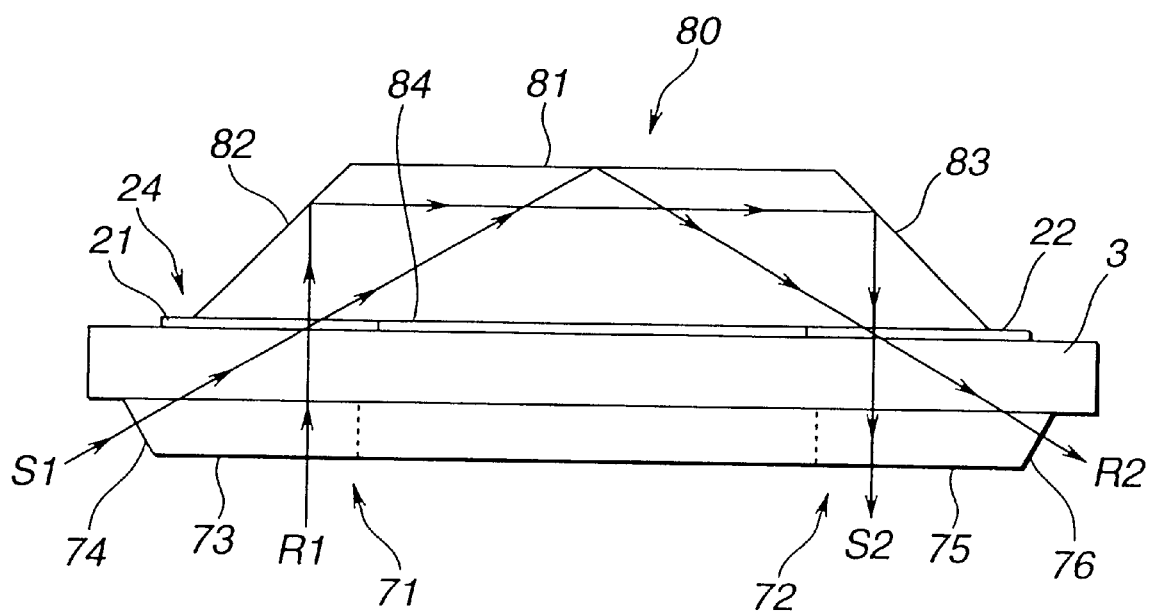
FIG. 30 is a schematic view showing an exposing system in a twenty-fifth practical example according to the present invention.

FIGS. 28 and 30 are schematic views showing exposing systems of twenty-fifth and twenty-sixth practical examples according to the present invention.

PRACTICAL EXAMPLE 25

Figure 29:
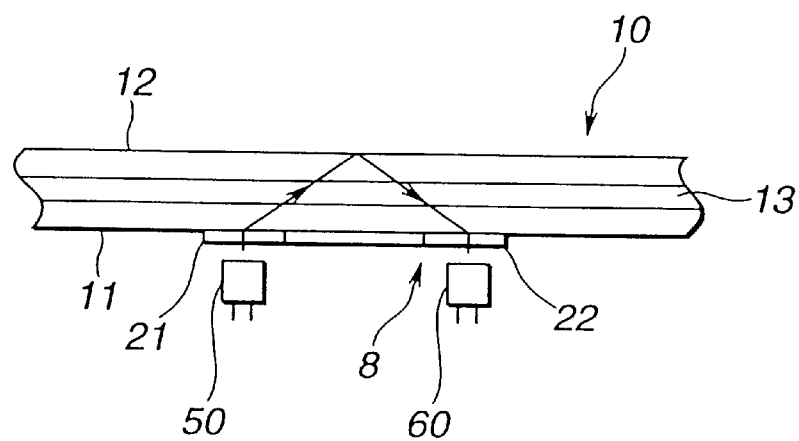
FIG. 29 is a schematic view showing a rain sensor using a hologram sheet produced by the exposing system of FIG. 28.

FIGS. 28 and 29 show a twenty-fifth practical example according to the present invention. An exposing system of this example is for producing an entrance hologram and an exit hologram to be attached to a vehicle windshield glass panel for sensing raindrops. A light sensitive film is attached to a glass plate 3 having a thickness equaling a half (about 2.4 mm) of the thickness (about 4.8 mm) of a vehicle windshield glass panel. The first reference beam R1 and the second object beam S2 are directed independently to the light sensitive film.

First, a dry plate is prepared by applying a light sensitive film (such as Dupont OmniDex-352 ) 24 on the glass plate 3 in the same manner as in the 20th example. Second, first and second prisms 71 and 72 identical to the prisms used in the 20th example are put in contact with the light sensitive film 24 of the dry plate in the same manner as in the 20th example.

Moreover, a glass block 80 is put in contact with a glass surface of the glass plate 3. The glass block 80 has a first flat (parallel) surface 81, second and third flat (inclined) surface 82 and 83, and a fourth flat surface 84. The fourth surface 84 is put in contact with the glass surface of the glass plate 3. Each of the second and third inclined surfaces 82 and 83 are inclined so as to form an angle of 45.0° with a normal to the surface of the light sensitive film 24. The first and fourth surfaces 81 and 84 are parallel to the surface of the light sensitive film 24. The first surface 81 extends between the second and third inclined surfaces 82 and 83. These four surfaces 81 84 of the glass block 80 form an isosceles trapezoid in a cross section as shown in FIG. 28. This trapezoid is symmetrical so that the trapezoid can be divided into left and right equal halves by an imaginary median plane. The second and third inclined surfaces 82 and 83 are symmetrically arranged on both sides of the imaginary median plane. The length of the first surface 81 is smaller than the length of the fourth surface in the cross section of FIG. 28. In this example, the height of the glass block 80 measured between the first and fourth surfaces 81 and 84 is equal to 2.4 mm.

Third, first and second laser beams are supplied by dividing an original laser beam with an optical system including a laser light source for producing light of 532 nm, a beam splitter, lenses and mirrors. The first laser beam is directed to the second inclined face 74 of the first prism 71 as the first object beam S1 from an incident direction approximately coincident with the normal to the inclined prism face 74. The second laser beam is directed to the first face 73 of the first prism 71 as the first reference beam R1 from an incident direction approximately coincident with the normal to the prism face 73.

The first object beam S1 and the first reference beam R1 pass through each other and create an interference pattern which is recorded as a first hologram 21 in the first region of the light sensitive film 24. The first object beam S1 further travels through the glass plate 3 obliquely and reaches the first surface 81 of the glass block 80. Then, the first object beam S1 reflects totally back from the first surface 81 of the glass block 80, passes through the second region of the light sensitive film 24 as the second reference beam R2, and emerges from the inclined face 76 of the second prism 72 into the air. The first reference beam R1 passes through the glass plate 3 along its thickness direction, travels through the glass block 80 up to the second surface 82 of the glass block 80, reflects from the second surface 82 to a direction parallel to the light sensitive film 24 toward the third surface 83 of the glass block 80, further reflects from the third surface 83 to a direction perpendicular to the light sensitive film 24, passes through the second region of the light sensitive film 24 as the second object beam S2 and emerges from the first face 75 of the second prism 72. The second object beam S2 and the second reference beam R2 meet each other and form an interference pattern which is recorded as a second hologram 22 in the second region of the light sensitive film 24.

Thus, the first laser beam travels through a triangular path defined by the second face 74 of the first prism 72, the first surface 81 of the glass block 80 and the second face 76 of the second prism 72. The second laser beam travels through a rectangular path defined by the first face 73 of the first prism 71, the second surface 82 of the glass block 80, the third surface 83 of the glass block 80 and the first face 75 of the second prism 72.

It is preferable to deviate the incident direction of each laser beam to any surface of the prisms 71 and 72 or the glass plate 3, from the exact normal to that surface. The angle difference between the incident direction and the exact normal is about 1°. If a laser light is aimed at a plane of incidence in the exact normal direction, the light is reflected from the plane of incident, and returns to a laser source, making the laser beam unstable. The slight deviation of the incident beam from the normal prevents such undesired return of the laser light to the source.

In this way, from the light sensitive film, the exposing system forms a hologram sheet 8 having the first and second holograms 21 and 22. The hologram sheet is affixed, as shown in FIG. 29, to the inside surface of a laminated glass plate including 2 mm thick inside and outside glass layers 11 and 12 bonded together by an intermediate layer of polyvinyl butyral having a thickness of about 0.8 mm sandwiched between the inside and outside layers 11 and 12. The total thickness of the laminated glass plate is about 4.8 mm. A light emitting device 50 is fixed in front of the first hologram 21, and a light receiving device 60 is fixed in front of the second hologram 22 to form a rain sensor. Then, the laminated glass plate is installed in a front opening of a vehicle body of a motor vehicle, as a windshield. The thus-formed rain sensor shown in FIG. 29 can sense raindrop on the windshield of the vehicle in the same manner as the sensor of FIG. 1.

In this rain sensor shown in FIG. 29, the sensing light does not reach the intermediate region between the first and second holograms 21 and 22 of the hologram sheet. The sensing light is not reflected by the interface between the air and the hologram sheet. Therefore, the rain detection of this rain sensor is not disturbed by dew formed on the light sensitive film 8.

In this practical example, it is possible to make the first and second holograms of reflection type by reversing the first reference beam R1 while holding the first object beam S1 unchanged, or by reversing the direction of the first object beam S1 while holding the direction of the first reference beam R1 unchanged. The thus-formed hologram sheet having the first and second reflection holograms can be used within a laminated glass plate, for example, between an outside glass layer and an inside glass layer.

PRACTICAL EXAMPLE 26

As shown in FIG. 30, the light sensitive film 24 formed on the glass plate 3 is sandwiched between the glass plate 3 and the glass block 80. The first and second prisms 71 and 72 are put in contact with the opposite glass surface of the glass plate 3. The glass plate 3 is located between the light sensitive film 24 and the pair of the first and second prisms 71 and 72. Moreover, the first and second prisms 71 and 72 are integral parts of a single glass block. FIG. 30 shows the first and second prisms 71 and 72 as if they were distinct pieces by broken lines for the purpose of illustration. In other respects, the exposing system of FIG. 30 is almost the same as the example of FIG. 28.

Figure 31:
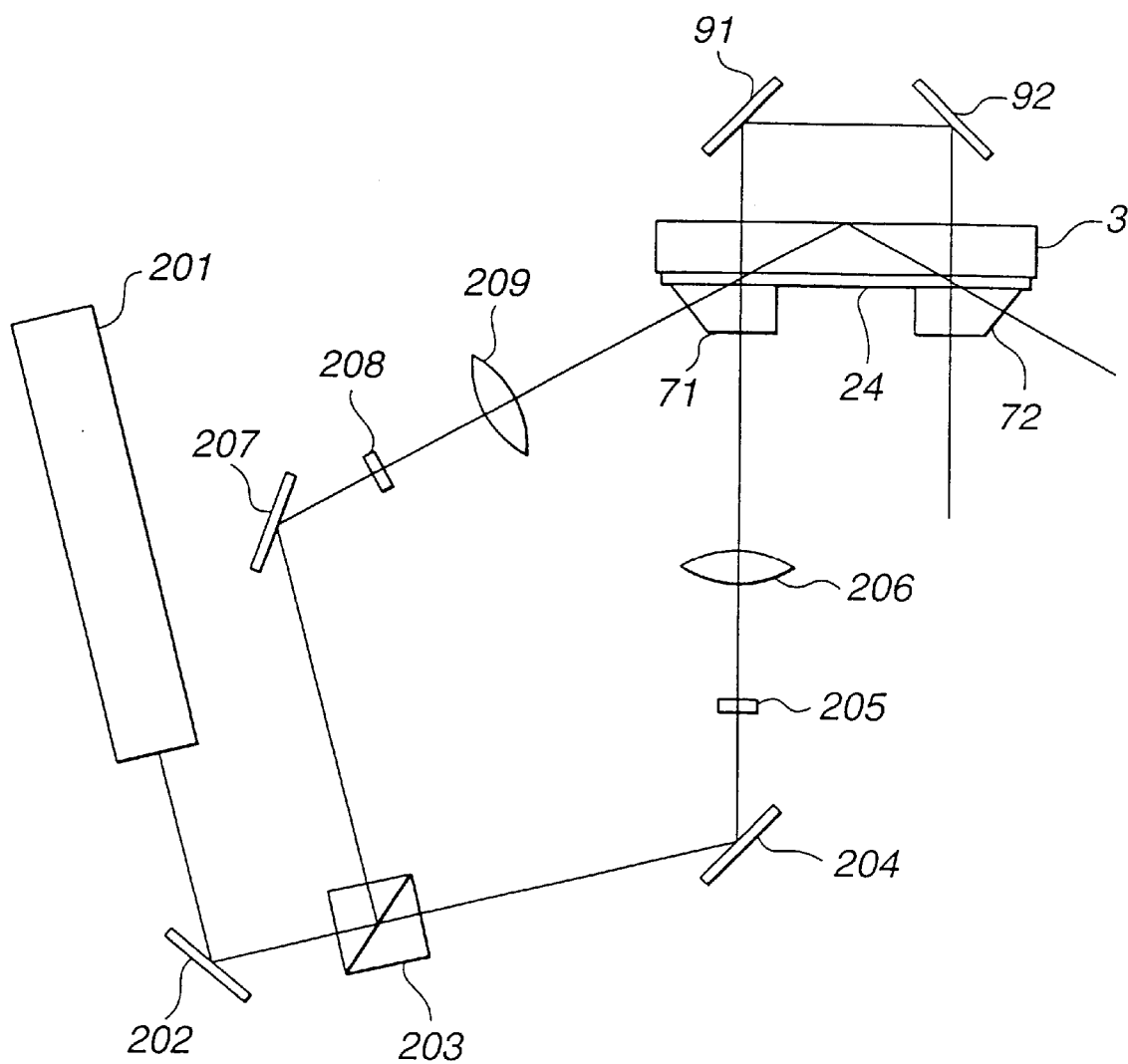
FIG. 31 is a schematic view showing an optical system which can be used in the exposing systems according to the present invention.

FIG. 31 shows an optical system which can be employed in the present invention. In the example of FIG. 31, the optical system is used in the exposing system of FIG. 25. The optical system shown in FIG. 31 includes a laser light source 201, a mirror 202, a beam splitter 203, a first subsystem including a mirror 204, a spatial filter 205 and at least one lens 206, for directing the first reference beam R1, a second subsystem including a mirror 207, a spatial filter 208 and at least one lens 209, for directing the first object beam S1, and a third subsystem including mirrors 91 and 92 for directing the second object beam S2.

Although the invention has been described above with reference to certain practical examples of the invention, the invention is not limited to the practical examples described above. Modifications and variations of the practical examples described above will occur to those skilled in the art in light of the above teachings.

What is claimed is:

1. A water sensor comprising:
   a transparent plate;
   a light emitting device for emitting sensing light so that the sensing light travels in the transparent plate by internal reflection in the transparent plate;
   a light receiving device for receiving the sensing light from the transparent plate to sense water on the transparent plate; and
   first and second holograms defining a light path of the sensing light through the transparent plate from the light emitting device to the light receiving device.

2. A water sensor according to claim 1 wherein the first hologram and the second hologram are united in a single hologram sheet so that both holograms are integral parts of the single hologram sheet.

3. A water sensor according to claim 2 wherein the transparent plate has first and second plate surfaces, the hologram sheet is attached to the transparent plate, and the hologram sheet extends along the first plate surface to define the light path between the first plate surface and the hologram sheet so that the sensing light is totally reflected from the first plate surface at least once to sense a drop of water on the first plate surface.

4. A water sensor according to claim 3 wherein the transparent plate is a laminated plate comprising first and second layers, and the hologram sheet is placed between the first and second layers.

5. A water sensor according to claim 4 wherein the transparent plate further comprises a shaded intermediate layer sandwiched between the first and second layers, and the shaded intermediate layer comprises a first transparent opening for allowing the sensing light to pass from the second layer to the first layer and a second transparent opening for allowing the sensing light to pass from the first layer to the second layer.

6. A water sensor according to claim 4 wherein one of first and second plate surfaces is an outside plate surface, the other of the first and second plate surfaces is an inside plate surface, the water sensor is arranged to sense at least one of rain on the outside plate surface and dew on the inside plate surface.

7. A water sensor according to claim 1 wherein one of the first and second holograms is an entrance hologram for guiding the sensing light from an entrance path from the light emitting device to a total reflection path in the transparent plate, and the other of the first and second holograms is an exit hologram for guiding the sensing light from the total reflection path to an exit path to the light receiving device.

8. A water sensor according to claim 7 wherein the entrance hologram and the exist hologram are united in a single hologram sheet so that both holograms are integral parts of the single hologram sheet, and wherein the hologram sheet comprises an intermediate region separating the entrance and exit holograms.

9. A water sensor according to claim 7 wherein each of the entrance hologram and the exist hologram is a transmission hologram.

10. A water sensor according to claim 1 wherein the water sensor further comprises an intermediate hologram defining the light path of the sensing light in the transparent plate between the first and second holograms.

11. A water sensor according to claim 10 wherein the first and second holograms and the intermediate hologram are united in a single hologram sheet so that all the holograms are integral parts of the single hologram sheet.

12. A water sensor according to claim 11 wherein the first and second holograms are separated from each other by the intermediate hologram located between the first and second holograms.

13. A water sensor according to claim 11 wherein the intermediate hologram is a return hologram for forming a turn in the light path from a first advancing direction extending to the turn along a surface of the transparent plate to a second advancing direction extending from the turn along the surface of the transparent plate.

14. A water sensor according to claim 10 wherein the intermediate hologram is a converging hologram for converging light toward the light receiving device.

15. A water sensor according to claim 10 wherein the first hologram is a diverging hologram for diverging the sensing light toward the intermediate hologram.

16. A water sensor according to claim 10 wherein the intermediate hologram is a total reflection hologram for defining a total reflection path of the sensing light between a surface of the transparent plate and the total reflection hologram.

17. A water sensor according to claim 1 wherein the transparent plate is a laminated plate comprising an outside layer having an outside plate surface of the transparent plate and an inside layer having an inside plate surface, and the first and second holograms are arranged to define a rain sensing light path of a rain sensing light beam internally reflected in the outside layer to sense rain on the outside plate surface and a dew sensing light path of a dew sensing light beam internally reflected in the inside layer to sense dew on the inside plate surface.

18. A water sensor according to claim 17 wherein one of the first and second holograms is a total reflection hologram provided between the first and second layers, for defining at least one of the rain sensing light path and the dew sensing light path.

19. A water sensor according to claim 18 wherein the water sensor further comprises another light receiving device and beam supplying means for supplying the rain sensing light beam and the dew sensing light beam, the beam supplying means comprises the light emitting device, one of the light receiving devices is a rain sensing device for sensing a raindrop on the outside plate surface by receiving the rain sensing light beam internally reflected in the outside layer of the transparent plate, the other of the light receiving devices is a dew sensing device for sensing dew on the inside plate surface by receiving the dew sensing light beam internally reflected in the inside layer of the transparent plate.

20. A water sensor according to claim 19 wherein the water sensor further comprises another light emitting device, one of the light emitting devices is a dew sensing light emitting device for emitting the rain sensing light beam, and the other of the light emitting devices is a rain sensing light beam emitting device for emitting the rain sensing light beam.

21. A water sensor according to claim 19 wherein the beam supplying means comprises a splitting element for dividing the sensing light from the light emitting device into the rain sensing beam and the dew sensing beam, and wherein the splitting element is a splitting sheet placed between the outside and inside layers.

22. A water sensor according to claim 21 wherein the splitting sheet is a splitting entrance hologram for providing the dew sensing beam by reflecting part of the sensing light from the light emitting device and providing the rain sensing beam by transmitting the sensing light from the light emitting device.

23. A water sensor according to claim 21 wherein the water sensor further comprises a rain sensing beam entrance hologram located just above the splitting entrance hologram, for defining a total reflection path of the rain sensing beam in the outside layer.

24. A water sensor according to claim 23 wherein one of the first and second holograms is the total reflection hologram and the other of the first and second holograms is an exit hologram, and wherein the splitting entrance hologram, the transmission hologram and the exit hologram are united in a single hologram sheet.

25. A water sensor according to claim 24 wherein the rain sensing beam entrance hologram is superposed on the splitting entrance hologram.

26. A water sensor according to claim 24 wherein the water sensor further comprises another exit hologram, one of the exit holograms is a dew sensing beam exit hologram for redirecting the dew sensing beam toward the dew sensing device and the other of the exit holograms is a rain sensing beam exit hologram for redirecting the rain sensing beam to the rain sensing device.

27. A water sensor according to claim 26 wherein the splitting hologram, the total reflection hologram, the dew sensing beam exit hologram and the rain sensing beam exit hologram are united in a single hologram sheet.

28. A water sensor according to claim 24 wherein the total reflection hologram is located between the entrance hologram and the exit hologram.

29. A water sensor according to claim 25 wherein the water sensor further comprises a dew sensing beam return hologram for receiving the dew sensing beam from the splitting entrance beam and redirecting the dew sensing beam to the dew sensing exit hologram and a rain sensing beam return hologram for receiving the rain sensing beam from the rain sensing beam entrance beam and redirecting the rain sensing beam to the rain sensing exit hologram, and the transmission hologram is located between a first zone in which the entrance and exit holograms are formed and a second zone in which the return holograms are formed.

30. A water sensor according to claim 19 wherein one of the first and second holograms is the total reflection hologram which is an outside total reflection hologram, and the other of the first and second holograms is an inside total reflection hologram, the laminated plate further comprises a shaded intermediate layer sandwiched between the outside and inside layers, the outside total reflection hologram is sandwiched between the outside layer and the intermediate layer, and the inside total reflection hologram is sandwiched between the inside layer and the intermediate layer.

31. A water sensor according to claim 30 wherein the shaded intermediate layer is formed with at least one transparent window for transmitting the rain sensing beam between the outside layer and the inside layer.

32. A water sensor according to claim 19 wherein at least one of the light emitting and light receiving devices is aimed at an edge of the transparent plate so that the sensing light passes through the edge of the transparent plate.

33. A water sensor according to claim 1 wherein the transparent plate has an outside plate surface and an inside plate surface, and the light emitting and light receiving devices are aimed at the inside plate surface of the transparent plate.

34. A water sensor according to claim 1 wherein at least one of the light emitting and light receiving devices is aimed at an edge of the transparent plate.

35. A water sensor comprising:
    a transparent plate
    a light emitting device for emitting sensing light so that the sensing light travels in the transparent plate by internal reflection in the transparent plate;
    a light receiving device for receiving the sensing light from the transparent plate to sense water on the transparent plate; and
    a hologram for defining a light path of the sensing light through the transparent plate from the light emitting device to the light receiving device.

36. A water sensor according to claim 35 wherein at least one of the light emitting device and the light receiving device is aimed at an edge of the transparent plate so that the sensing light passes through the edge of the transparent plate.

37. A water sensor according to claim 36 wherein the light emitting device is aimed at the edge of the transparent plate so as to introduce the sensing light into the transparent plate through the edge, and the hologram is an exit hologram for directing the hologram to the light receiving device through a plate surface of the transparent plate.

38. A water sensor according to claim 36 wherein the light receiving device is aimed at the edge of the transparent plate so as to take out the sensing light from the transparent plate through the edge, and the hologram is an entrance hologram for directing the hologram to the light receiving device through a plate surface of the transparent plate.

39. A water sensor according to claim 36 wherein the light emitting device and the light receiving device are both aimed at the edge of the transparent plate so that the sensing light enters and exits the transparent plate through the edge, and the hologram is a return hologram for receiving the sensing light traveling in a first total reflection path from the light emitting device, and redirecting the sensing light to a second total reflection path toward the light receiving device.

40. A water sensor according to claim 39 wherein the first and second total reflection paths both extend in an imaginary cross sectional plane.

41. A water sensor according to claim 39 wherein the first total reflection path lies in a first imaginary cross sectional plane and the second total reflection path lies in a second imaginary cross section plane.

42. An exposing system for producing a hologram, comprising:
    a transparent plate member for defining a reflection surface and a contact surface, and holding a light sensitive film between the reflection surface and the contact surface;
    a first prism having a contact face for contacting with the contact surface of the plate member, a first face for guiding a first reference beam so that the first reference beam travels through a first region of the light sensitive film, and a second face for guiding a laser beam so that the laser beam travels through the first region of the light sensitive film as a first object beam to form a first hologram in the first region of the light sensitive film with the first reference beam; and
    a second prism having a contact face for contacting with the contact surface of the plate member, a first face for guiding a second object beam so that the second object beam travels through a second region of the light sensitive film, and a second face for guiding the laser beam reflected internally from the reflection surface of the plate member so that the reflected laser beam travels through the second region of the light sensitive film as a second reference beam to form a second hologram in the second region of the light sensitive film with the second object beam.

43. An exposing system according to claim 42 wherein the plate member comprises a glass plate defining the reflection surface, the contact faces of the first and second prisms are in contact with the light sensitive film which is attached to the glass plate and which defines the contact surface.

44. An exposing system according to claim 43 wherein the second face of the first prism is so inclined as to allow the first object beam to enter the glass plate from the second face of the first prism through the first region of the light sensitive film in a direction to cause total internal reflection of the first object beam by the reflection surface in the glass plate, and the second face of the second prism is so inclined as to allow the first object beam reflected from the reflection surface to exit the glass plate, as the second reference beam, through the second region of the light sensitive film.

45. An exposing system according to claim 44 wherein the exposing system comprises an optical system for causing the first reference beam to enter the glass plate from the first face of the first prism through the first region of the light sensitive film, and to exit the glass plate through the reflecting surface, and for causing the second object beam to enter the glass plate through the reflecting surface and to exit the glass plate through the second region of the light sensitive film and the first face of the second prism.

46. An exposing system according to claim 44 wherein the exposing system comprises an optical system for causing the first reference beam to enter the glass plate from the reflection surface and to exit the glass plate through the first region of the light sensitive film and the first face of the first prism, and for causing the second object beam to enter the glass plate from the first face of the second prism through the second region of the light sensitive film and to exit the glass plate through the reflection surface.

47. An exposing system according to claim 44 wherein the exposing system comprises an optical system for causing the first reference beam to enter the glass plate from the first face of the first prism through the first region of the light sensitive film, and to exit the glass plate through the reflecting surface, and for causing the second object beam to enter the glass plate from the first face of the second prism through the second region of the light sensitive film and to exit the glass plate through the reflection surface.

48. An exposing system according to claim 44 wherein the first and second prisms are separated from each other so that the laser beam is reflected by a third region of the light sensitive film between the first and second regions.

49. An exposing system according to claim 48 wherein the third region of the light sensitive film is a sensitive region in which a third hologram for propagation is formed by the beam reflected totally in the plate member.

50. An exposing system according to claim 42 wherein the second face of the first prism is inclined to allow the first object beam to enter the transparent plate member at an angle greater than a critical angle of the transparent plate member.

51. An exposing system according to claim 42 wherein the transparent plate member comprises the reflection surface for internally reflecting the laser beam which is a first laser beam, to define a first light path of the first laser beam, and first and second surfaces for internally reflecting a second laser beam to define a second light path from one of the first faces of the first and second prisms to the other of the first faces of the first and second prisms, so that the second laser beam passes through the first region of the light sensitive film as the first reference beam, and passes through the second region of the light sensitive film as the second object beam.

52. An exposing system according to claim 51 wherein the reflection surface is located between the first and second surfaces of the transparent plate member, the first surface of the transparent plate member confronts the first prism across the first region of the light sensitive film, and the second surface of the transparent plate member confronts the second prism across the second region of the light sensitive film.

53. An exposing system according to claim 52 wherein the transparent plate member comprises a glass block having the reflection surface extending along the light sensitive film, for internally reflecting the first laser beam to define the first light path obliquely crossing each of the first and second regions of the light sensitive film, and the first and second surfaces inclined with respect to the reflection surface so as to form a trapezoidal cross section.

54. An exposing system according to claim 53 wherein the transparent plate member further comprises a glass plate having a first surface and a second surface for fixedly holding the light sensitive film, and the glass plate is placed between the glass block and a pair of the first and second prisms.

55. An exposing system according to claim 54 wherein the first surface of the glass plate is in contact with the glass block and the contact faces of the first and second prisms are in contact with the light sensitive film.

56. An exposing system according to claim 54 wherein the contact faces of the first and second prisms are in contact with the first surface of the glass plate, and the light sensitive film is sandwiched between the glass block and the glass plate.

57. An exposing system according to claim 42 wherein the first and second prisms are integral parts of a single glass block.

58. An exposing system according to claim 42 wherein the exposing system further comprises an optical system for supplying said laser beam, said first reference beam and said second object beam and the optical system comprises a laser light source.

59. An exposing system according to claim 58 wherein the optical system further comprises a first subsystem for directing said laser beam to the second face of one of the first and second prisms, a second subsystem for directing the first reference beam to the first face of the first prism, and a third subsystem for directing the second object beam to the first face of the second prism.

* * * * *